(12) United States Patent
Ellis

(10) Patent No.: US 8,407,737 B1
(45) Date of Patent: Mar. 26, 2013

(54) SYSTEMS AND METHODS FOR PROVIDING A SCAN TRANSPORT BAR

(75) Inventor: Michael D. Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 674 days.

(21) Appl. No.: 11/827,246

(22) Filed: Jul. 11, 2007

(51) Int. Cl.
G06F 3/00 (2006.01)
G06F 13/00 (2006.01)
H04N 5/445 (2006.01)

(52) U.S. Cl. ............ 725/38; 725/37; 725/39; 725/43; 725/52; 348/569; 348/570

(58) Field of Classification Search ............ 725/38, 725/52
See application file for complete search history.

(56) References Cited

U.S. PATENT DOCUMENTS

| | | |
|---|---|---|
| 3,440,427 A | 4/1969 | Kammer |
| 3,492,577 A | 1/1970 | Reiter et al. |
| 3,493,674 A | 2/1970 | Houghton |
| 3,833,757 A | 9/1974 | Kirk, Jr. et al. |
| 3,848,193 A | 11/1974 | Martin et al. |
| 3,891,792 A | 6/1975 | Kimura |
| 3,893,049 A | 7/1975 | Bray |
| 3,936,868 A | 2/1976 | Thorpe |
| 3,956,745 A | 5/1976 | Ellis |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,198 A | 5/1979 | Heuer |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |

(Continued)

FOREIGN PATENT DOCUMENTS

| | | |
|---|---|---|
| CA | 1196082 A1 | 10/1985 |
| CA | 1217269 A1 | 1/1987 |

(Continued)

OTHER PUBLICATIONS

"A New Face for Spreadsheets." PC Magazine, Dec. 22, 1987.

(Continued)

Primary Examiner — Robert Hance
(74) Attorney, Agent, or Firm — Ropes & Gray LLP

(57) ABSTRACT

A scan transport bar is disclosed. The scan transport bar includes a number of cells indicating programs within the scan. The scan transport bar is displayed with the currently-tuned program. The scan transport bar includes tuning sequence numbers for allowing users to easily tune to programs within the scan. A countdown timer is also provided that indicates the amount of time until the next tune in the scan.

87 Claims, 8 Drawing Sheets

U.S. PATENT DOCUMENTS

| | | | |
|---|---|---|---|
| 4,203,130 A | 5/1980 | Doumit et al. |
| 4,205,343 A | 5/1980 | Barrett |
| 4,218,698 A | 8/1980 | Bart et al. |
| 4,224,644 A | 9/1980 | Lewis et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,276,597 A | 6/1981 | Dissly et al. |
| 4,283,787 A | 8/1981 | Chambers |
| 4,288,809 A | 9/1981 | Yabe |
| 4,305,101 A | 12/1981 | Yarbrough et al. |
| 4,325,081 A | 4/1982 | Abe et al. |
| 4,329,684 A | 5/1982 | Monteath et al. |
| 4,337,480 A | 6/1982 | Bourassin et al. |
| 4,337,483 A | 6/1982 | Guillou |
| 4,338,644 A | 7/1982 | Staar |
| 4,339,798 A | 7/1982 | Hedges et al. |
| 4,344,090 A | 8/1982 | Belisomi et al. |
| 4,347,498 A | 8/1982 | Lee et al. |
| 4,355,415 A | 10/1982 | George et al. |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,392,247 A | 7/1983 | van Deursen |
| 4,393,376 A | 7/1983 | Thomas |
| 4,394,691 A | 7/1983 | Amano et al. |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,422,105 A | 12/1983 | Rodesch et al. |
| 4,425,579 A | 1/1984 | Merrell |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,527,194 A | 7/1985 | Sirazi |
| 4,531,020 A | 7/1985 | Wechselberger et al. |
| 4,535,333 A | 8/1985 | Twardowski |
| 4,536,791 A | 8/1985 | Campbell et al. |
| 4,547,804 A | 10/1985 | Greenberg |
| 4,554,584 A | 11/1985 | Elam et al. |
| 4,566,034 A | 1/1986 | Harger |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,605,964 A | 8/1986 | Chard |
| 4,605,973 A | 8/1986 | Von Kohorn |
| 4,608,859 A | 9/1986 | Rockley |
| 4,611,269 A | 9/1986 | Suzuki et al. |
| 4,620,229 A | 10/1986 | Amano et al. |
| 4,622,545 A | 11/1986 | Atkinson |
| 4,625,080 A | 11/1986 | Scott |
| 4,626,848 A | 12/1986 | Ehlers |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| 4,718,107 A | 1/1988 | Hayes |
| 4,737,993 A | 4/1988 | DeVilbiss |
| 4,739,406 A | 4/1988 | Morton et al. |
| 4,746,983 A | 5/1988 | Hakamada |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,775,935 A | 10/1988 | Yourick |
| 4,776,038 A | 10/1988 | Testin et al. |
| 4,787,063 A | 11/1988 | Muguet |
| 4,789,962 A | 12/1988 | Berry et al. |
| 4,802,114 A | 1/1989 | Sogame et al. |
| 4,807,052 A | 2/1989 | Amano et al. |
| 4,809,325 A | 2/1989 | Hayashi et al. |
| 4,812,940 A | 3/1989 | Takenaga |
| 4,821,102 A | 4/1989 | Ichikawa et al. |
| 4,821,211 A | 4/1989 | Torres |
| 4,841,132 A | 6/1989 | Kajitani et al. |
| 4,841,368 A | 6/1989 | Rumbolt et al. |
| 4,843,482 A | 6/1989 | Hegendorfer |
| 4,847,696 A | 7/1989 | Matsumoto et al. |
| 4,855,833 A | 8/1989 | Kageyama et al. |
| 4,862,268 A | 8/1989 | Campbell et al. |
| 4,868,735 A | 9/1989 | Moller et al. |
| 4,870,492 A | 9/1989 | Hakamada et al. |
| 4,873,584 A | 10/1989 | Hashimoto |
| 4,879,611 A | 11/1989 | Fukui et al. |
| 4,885,775 A | 12/1989 | Lucas |
| 4,888,796 A | 12/1989 | Olivo, Jr. |
| 4,890,321 A | 12/1989 | Seth-Smith et al. |
| 4,894,789 A | 1/1990 | Yee |
| 4,908,707 A | 3/1990 | Kinghorn |
| 4,908,713 A | 3/1990 | Levine |
| 4,908,859 A | 3/1990 | Bennett et al. |
| 4,914,516 A | 4/1990 | Duffield |
| 4,914,517 A | 4/1990 | Duffield |
| 4,930,158 A | 5/1990 | Vogel |
| 4,930,160 A | 5/1990 | Vogel |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,969,209 A | 11/1990 | Schwob |
| 4,977,455 A | 12/1990 | Young |
| 4,989,104 A | 1/1991 | Schulein et al. |
| 4,991,011 A | 2/1991 | Johnson et al. |
| 4,996,597 A | 2/1991 | Duffield |
| 4,998,171 A | 3/1991 | Kim et al. |
| 5,005,084 A | 4/1991 | Skinner |
| 5,023,727 A | 6/1991 | Boyd et al. |
| 5,027,400 A | 6/1991 | Baji et al. |
| 5,038,211 A | 8/1991 | Hallenbeck |
| 5,045,947 A | 9/1991 | Beery |
| 5,047,867 A | 9/1991 | Strubbe et al. |
| 5,068,734 A | 11/1991 | Beery |
| 5,091,785 A | 2/1992 | Canfield et al. |
| 5,103,314 A | 4/1992 | Keenan |
| 5,123,046 A | 6/1992 | Levine |
| 5,151,789 A | 9/1992 | Young |
| 5,155,762 A | 10/1992 | Croquet et al. |
| 5,161,023 A | 11/1992 | Keenan |
| 5,172,111 A | 12/1992 | Olivo, Jr. |
| 5,179,439 A | 1/1993 | Hashimoto |
| 5,179,654 A | 1/1993 | Richards et al. |
| 5,182,646 A | 1/1993 | Keenan |
| 5,187,589 A | 2/1993 | Kono et al. |
| 5,193,005 A | 3/1993 | Tomita |
| 5,193,009 A | 3/1993 | Park |
| 5,194,941 A | 3/1993 | Grimaldi et al. |
| 5,194,954 A | 3/1993 | Duffield |
| 5,200,823 A | 4/1993 | Yoneda et al. |
| 5,210,611 A | 5/1993 | Yee et al. |
| 5,223,924 A | 6/1993 | Strubbe |
| 5,231,493 A | 7/1993 | Apitz |

| | | | | | | |
|---|---|---|---|---|---|---|
| 5,235,415 A | 8/1993 | Bonicel et al. | | 5,657,414 A | 8/1997 | Lett et al. |
| 5,237,411 A | 8/1993 | Fink et al. | | 5,659,350 A | 8/1997 | Hendricks et al. |
| 5,237,417 A | 8/1993 | Hayashi et al. | | 5,659,367 A | 8/1997 | Yuen |
| 5,251,034 A | 10/1993 | Na | | 5,673,089 A | 9/1997 | Yuen et al. |
| 5,253,066 A | 10/1993 | Vogel | | 5,677,708 A | 10/1997 | Matthews, III et al. |
| 5,253,067 A | 10/1993 | Chaney et al. | | 5,682,195 A | 10/1997 | Hendricks et al. |
| 5,260,788 A | 11/1993 | Takano et al. | | 5,684,525 A | 11/1997 | Klosterman |
| 5,293,357 A | 3/1994 | Hallenbeck | | 5,699,107 A | 12/1997 | Lawler et al. |
| 5,296,931 A | 3/1994 | Na et al. | | 5,727,060 A | 3/1998 | Young |
| 5,301,028 A | 4/1994 | Banker et al. | | 5,731,844 A | 3/1998 | Rauch et al. |
| 5,307,173 A | 4/1994 | Yuen et al. | | 5,734,853 A | 3/1998 | Hendricks et al. |
| 5,317,403 A | 5/1994 | Keenan | | 5,742,563 A | 4/1998 | Kataoka et al. |
| 5,323,234 A | 6/1994 | Kawasaki | | 5,745,710 A | 4/1998 | Clanton, III et al. |
| 5,323,240 A | 6/1994 | Amano et al. | | 5,774,887 A | 6/1998 | Wolff et al. |
| 5,335,277 A | 8/1994 | Harvey et al. | | 5,781,246 A | 7/1998 | Alten et al. |
| 5,353,121 A | 10/1994 | Young et al. | | 5,797,011 A | 8/1998 | Kroll et al. |
| 5,355,079 A | 10/1994 | Evans et al. | | 5,798,785 A | 8/1998 | Hendricks et al. |
| 5,355,162 A | 10/1994 | Yazolino et al. | | 5,800,768 A | 9/1998 | Kim et al. |
| 5,357,276 A | 10/1994 | Banker et al. | | 5,801,787 A | 9/1998 | Schein et al. |
| 5,359,601 A | 10/1994 | Wasilewski et al. | | 5,805,763 A | 9/1998 | Lawler et al. |
| 5,371,550 A | 12/1994 | Shibutani et al. | | 5,808,608 A | 9/1998 | Young et al. |
| 5,371,553 A | 12/1994 | Kawamura et al. | | 5,809,204 A | 9/1998 | Young et al. |
| 5,373,288 A | 12/1994 | Blahut | | 5,818,541 A | 10/1998 | Matsuura et al. |
| 5,377,319 A | 12/1994 | Kitahara et al. | | 5,822,123 A | 10/1998 | Davis et al. |
| 5,382,983 A | 1/1995 | Kwoh et al. | | 5,880,768 A | 3/1999 | Lemmons et al. |
| 5,384,910 A | 1/1995 | Torres | | 5,883,680 A | 3/1999 | Nykerk |
| 5,390,027 A | 2/1995 | Henmi et al. | | 5,886,746 A | 3/1999 | Yuen et al. |
| 5,398,074 A | 3/1995 | Duffield et al. | | 5,892,498 A | 4/1999 | Marshall et al. |
| 5,404,393 A | 4/1995 | Remillard | | 5,900,916 A | 5/1999 | Pauley |
| 5,408,692 A | 4/1995 | Suzuki et al. | | 5,907,323 A | 5/1999 | Lawler et al. |
| 5,410,326 A | 4/1995 | Goldstein | | 5,915,068 A | 6/1999 | Levine |
| 5,412,377 A | 5/1995 | Evans et al. | | 5,933,192 A | 8/1999 | Crosby et al. |
| 5,412,720 A | 5/1995 | Hoarty | | 5,936,614 A | 8/1999 | An et al. |
| 5,416,895 A | 5/1995 | Anderson et al. | | 5,940,073 A | 8/1999 | Klosterman et al. |
| 5,418,621 A | 5/1995 | Park | | 5,940,614 A | 8/1999 | Allen et al. |
| 5,425,101 A | 6/1995 | Woo et al. | | 5,949,954 A | 9/1999 | Young et al. |
| 5,434,678 A | 7/1995 | Abecassis | | 5,970,206 A | 10/1999 | Yuen et al. |
| 5,453,796 A | 9/1995 | Duffield et al. | | 5,986,650 A | 11/1999 | Ellis et al. |
| 5,473,442 A | 12/1995 | Kim et al. | | 5,990,927 A | 11/1999 | Hendricks et al. |
| 5,477,262 A | 12/1995 | Banker et al. | | 5,991,498 A | 11/1999 | Young |
| 5,479,266 A | 12/1995 | Young et al. | | 6,016,108 A | 1/2000 | Terk et al. |
| 5,479,268 A | 12/1995 | Young et al. | | 6,016,141 A | 1/2000 | Knudson et al. |
| 5,485,197 A | 1/1996 | Hoarty | | 6,020,929 A | 2/2000 | Marshall et al. |
| 5,485,221 A | 1/1996 | Banker et al. | | 6,025,837 A | 2/2000 | Matthews, III et al. |
| 5,485,518 A | 1/1996 | Hunter et al. | | 6,058,238 A | 5/2000 | Ng |
| 5,488,409 A | 1/1996 | Yuen et al. | | 6,061,060 A | 5/2000 | Berry et al. |
| 5,502,504 A | 3/1996 | Marshall et al. | | 6,072,535 A | 6/2000 | Kearns |
| 5,508,815 A | 4/1996 | Levine | | 6,078,348 A * | 6/2000 | Klosterman et al. ............ 725/40 |
| 5,517,254 A | 5/1996 | Monta et al. | | 6,141,003 A | 10/2000 | Chor et al. |
| 5,523,796 A | 6/1996 | Marshall et al. | | 6,151,059 A | 11/2000 | Schein et al. |
| 5,526,034 A | 6/1996 | Hoarty et al. | | 6,160,989 A | 12/2000 | Hendricks et al. |
| 5,528,304 A | 6/1996 | Cherrick et al. | | 6,167,188 A | 12/2000 | Young et al. |
| 5,530,684 A | 6/1996 | Kataoka et al. | | 6,177,931 B1 | 1/2001 | Alexander et al. |
| 5,532,754 A | 7/1996 | Young et al. | | 6,226,444 B1 | 5/2001 | Goldschmidt Iki et al. |
| 5,541,738 A | 7/1996 | Mankovitz | | 6,226,618 B1 | 5/2001 | Downs et al. |
| 5,546,521 A | 8/1996 | Martinez | | 6,239,794 B1 | 5/2001 | Yuen et al. |
| 5,552,833 A | 9/1996 | Henmi et al. | | 6,281,940 B1 * | 8/2001 | Sciammarella ............... 348/564 |
| 5,557,338 A | 9/1996 | Maze et al. | | 6,320,588 B1 | 11/2001 | Palmer et al. |
| 5,559,548 A | 9/1996 | Davis et al. | | 6,323,911 B1 | 11/2001 | Schein et al. |
| 5,559,549 A | 9/1996 | Hendricks et al. | | 6,324,338 B1 | 11/2001 | Wood et al. |
| 5,561,471 A | 10/1996 | Kim | | 6,341,374 B2 | 1/2002 | Schein et al. |
| 5,579,055 A | 11/1996 | Hamilton et al. | | 6,384,869 B1 * | 5/2002 | Sciammarella et al. ...... 348/564 |
| 5,583,560 A | 12/1996 | Florin et al. | | 6,388,714 B1 | 5/2002 | Schein et al. |
| 5,584,525 A | 12/1996 | Nakano et al. | | 6,407,049 B1 | 6/2002 | Willey et al. |
| 5,585,838 A | 12/1996 | Lawler et al. | | 6,418,556 B1 | 7/2002 | Bennington et al. |
| 5,585,866 A | 12/1996 | Miller et al. | | 6,425,129 B1 | 7/2002 | Sciammarella et al. |
| 5,589,892 A | 12/1996 | Knee et al. | | 6,430,358 B1 | 8/2002 | Yuen et al. |
| 5,592,551 A | 1/1997 | Lett et al. | | 6,445,306 B1 | 9/2002 | Trovato et al. |
| 5,594,509 A | 1/1997 | Florin et al. | | 6,452,620 B1 | 9/2002 | Kapushinski et al. |
| 5,596,361 A | 1/1997 | Martinez | | 6,470,497 B1 | 10/2002 | Ellis et al. |
| 5,596,373 A | 1/1997 | White et al. | | 6,473,903 B2 | 10/2002 | Balakrishnan et al. |
| 5,596,419 A | 1/1997 | Yoshimura et al. | | 6,498,895 B2 | 12/2002 | Young et al. |
| 5,600,364 A | 2/1997 | Hendricks et al. | | 6,515,680 B1 | 2/2003 | Hendricks et al. |
| 5,602,600 A | 2/1997 | Queinnec | | 6,536,041 B1 | 3/2003 | Knudson et al. |
| 5,614,940 A | 3/1997 | Cobbley et al. | | 6,563,515 B1 | 5/2003 | Reynolds et al. |
| 5,621,456 A | 4/1997 | Florin et al. | | 6,564,378 B1 | 5/2003 | Satterfield et al. |
| 5,623,282 A | 4/1997 | Graham et al. | | 6,614,987 B1 | 9/2003 | Ismail et al. |
| 5,629,733 A | 5/1997 | Youman et al. | | 6,637,029 B1 | 10/2003 | Maissel et al. |
| 5,635,978 A | 6/1997 | Alten et al. | | 6,651,253 B2 | 11/2003 | Dudkiewicz et al. |

| | | | | | | |
|---|---|---|---|---|---|---|
| 6,661,468 B2 | 12/2003 | Alten et al. | 2001/0052135 A1* | 12/2001 | Balakrishnan et al. | 725/135 |
| 6,678,706 B1 | 1/2004 | Fishel | 2001/0053944 A1 | 12/2001 | Marks et al. | |
| 6,744,967 B2 | 6/2004 | Kaminski et al. | 2002/0016971 A1 | 2/2002 | Berezowski et al. | |
| 6,756,997 B1 | 6/2004 | Ward, III et al. | 2002/0040475 A1 | 4/2002 | Yap et al. | |
| 6,801,262 B2 | 10/2004 | Adrain | 2002/0042920 A1 | 4/2002 | Thomas et al. | |
| 6,813,777 B1 | 11/2004 | Weinberger et al. | 2002/0049973 A1 | 4/2002 | Alten et al. | |
| 6,832,385 B2 | 12/2004 | Young et al. | 2002/0056098 A1 | 5/2002 | White | |
| 6,833,878 B2 | 12/2004 | Takagi et al. | 2002/0056119 A1 | 5/2002 | Moynihan | |
| 6,847,778 B1 | 1/2005 | Vallone et al. | 2002/0059595 A1* | 5/2002 | Goldschmidt Iki et al. | 725/37 |
| 6,850,691 B1 | 2/2005 | Stam et al. | 2002/0059610 A1 | 5/2002 | Ellis | |
| 6,850,693 B2 | 2/2005 | Young et al. | 2002/0075402 A1 | 6/2002 | Robson et al. | |
| 6,865,746 B1 | 3/2005 | Herrington et al. | 2002/0078453 A1 | 6/2002 | Kuo | |
| 6,868,225 B1 | 3/2005 | Brown et al. | 2002/0104083 A1 | 8/2002 | Hendricks et al. | |
| 6,870,573 B2 | 3/2005 | Yeo et al. | 2002/0113895 A1 | 8/2002 | Takagi et al. | |
| 6,874,152 B2 | 3/2005 | Vermeire et al. | 2002/0157099 A1 | 10/2002 | Schrader et al. | |
| 6,897,904 B2 | 5/2005 | Potrebic et al. | 2002/0165770 A1 | 11/2002 | Khoo et al. | |
| 6,898,762 B2 | 5/2005 | Ellis et al. | 2002/0174430 A1 | 11/2002 | Ellis et al. | |
| 6,906,643 B2 | 6/2005 | Samadani et al. | 2002/0175953 A1* | 11/2002 | Lin | 345/811 |
| 6,934,964 B1 | 8/2005 | Schaffer et al. | 2002/0186959 A1 | 12/2002 | Young et al. | |
| 6,971,121 B2 | 11/2005 | West et al. | 2002/0194600 A1 | 12/2002 | Ellis et al. | |
| 6,978,310 B1 | 12/2005 | Rodriguez et al. | 2002/0199192 A1 | 12/2002 | Donnelly | |
| 7,002,105 B2 | 2/2006 | Suzumi | 2003/0013424 A1 | 1/2003 | Adrain | |
| 7,003,791 B2 | 2/2006 | Mizutani | 2003/0018972 A1 | 1/2003 | Arora | |
| 7,007,294 B1 | 2/2006 | Kurapati | 2003/0046694 A1 | 3/2003 | Istvan et al. | |
| 7,013,478 B1 | 3/2006 | Hendricks et al. | 2003/0046695 A1 | 3/2003 | Billmaier et al. | |
| 7,047,547 B2 | 5/2006 | Alten et al. | 2003/0066077 A1 | 4/2003 | Gutta et al. | |
| 7,055,166 B1 | 5/2006 | Logan et al. | 2003/0093790 A1 | 5/2003 | Logan et al. | |
| 7,058,135 B2 | 6/2006 | Poslinski et al. | 2003/0093792 A1 | 5/2003 | Labeeb et al. | |
| 7,062,777 B2 | 6/2006 | Alba et al. | 2003/0093803 A1 | 5/2003 | Ishikawa et al. | |
| 7,096,185 B2 | 8/2006 | Reichardt et al. | 2003/0105589 A1 | 6/2003 | Liu et al. | |
| 7,100,185 B2 | 8/2006 | Bennington et al. | 2003/0110499 A1 | 6/2003 | Knudson et al. | |
| 7,151,886 B2 | 12/2006 | Young et al. | 2003/0122966 A1 | 7/2003 | Markman et al. | |
| 7,165,098 B1 | 1/2007 | Boyer et al. | 2003/0142957 A1 | 7/2003 | Young et al. | |
| 7,187,847 B2 | 3/2007 | Young et al. | 2003/0149621 A1 | 8/2003 | Shteyn | |
| 7,206,892 B2 | 4/2007 | Kim et al. | 2003/0159147 A1 | 8/2003 | Young et al. | |
| 7,209,640 B2 | 4/2007 | Young et al. | 2003/0185545 A1 | 10/2003 | Young et al. | |
| 7,213,089 B2 | 5/2007 | Hatakenaka | 2003/0192061 A1 | 10/2003 | Hwangbo et al. | |
| 7,224,889 B2 | 5/2007 | Takasu et al. | 2003/0196201 A1 | 10/2003 | Schein et al. | |
| 7,227,583 B2 | 6/2007 | Sin | 2003/0226145 A1 | 12/2003 | Marsh | |
| 7,231,607 B2 | 6/2007 | Neely et al. | 2004/0003394 A1 | 1/2004 | Ramaswamy | |
| 7,254,823 B2 | 8/2007 | Knudson | 2004/0003399 A1 | 1/2004 | Cooper | |
| 7,260,147 B2 | 8/2007 | Gordon et al. | 2004/0008971 A1 | 1/2004 | Young et al. | |
| 7,268,833 B2 | 9/2007 | Park et al. | 2004/0019908 A1 | 1/2004 | Williams et al. | |
| 7,283,992 B2 | 10/2007 | Liu et al. | 2004/0027485 A1 | 2/2004 | Kubota et al. | |
| 7,296,284 B1 | 11/2007 | Price et al. | 2004/0030599 A1 | 2/2004 | Sie et al. | |
| 7,302,112 B2 | 11/2007 | Shimazaki et al. | 2004/0064835 A1 | 4/2004 | Bellwood et al. | |
| 7,313,805 B1 | 12/2007 | Rosin et al. | 2004/0070593 A1 | 4/2004 | Neely et al. | |
| 7,334,195 B2 | 2/2008 | Gemmell et al. | 2004/0103434 A1 | 5/2004 | Ellis | |
| 7,363,645 B1 | 4/2008 | Hendricks | 2004/0111741 A1 | 6/2004 | DePietro | |
| 7,380,263 B2 | 5/2008 | Shintani | 2004/0117831 A1 | 6/2004 | Ellis et al. | |
| 7,386,871 B1 | 6/2008 | Knudson et al. | 2004/0131336 A1 | 7/2004 | Matsuno et al. | |
| 7,458,093 B2 | 11/2008 | Dukes et al. | 2004/0133910 A1 | 7/2004 | Gordon et al. | |
| 7,460,050 B2 | 12/2008 | Alvarado et al. | 2004/0177370 A1 | 9/2004 | Dudkiewicz | |
| 7,477,832 B2 | 1/2009 | Young et al. | 2004/0210926 A1 | 10/2004 | Francis et al. | |
| 7,546,623 B2 | 6/2009 | Ramraz et al. | 2004/0210932 A1 | 10/2004 | Mori et al. | |
| 7,603,685 B2 | 10/2009 | Knudson et al. | 2004/0217884 A1 | 11/2004 | Samadani et al. | |
| 7,610,010 B2 | 10/2009 | Onomatsu et al. | 2004/0239812 A1 | 12/2004 | Park et al. | |
| 7,617,511 B2 | 11/2009 | Marsh | 2004/0244051 A1 | 12/2004 | Kim et al. | |
| 7,620,968 B2 | 11/2009 | Donnelly | 2004/0268413 A1 | 12/2004 | Reid et al. | |
| 7,689,556 B2 | 3/2010 | Garg et al. | 2005/0006370 A1 | 1/2005 | Suzumi | |
| 7,738,765 B2 | 6/2010 | Matsuno et al. | 2005/0010754 A1 | 1/2005 | Brendel | |
| 7,748,017 B2 | 6/2010 | Kiiskinen | 2005/0028208 A1 | 2/2005 | Ellis et al. | |
| 7,748,018 B2 | 6/2010 | Young et al. | 2005/0044567 A1 | 2/2005 | Young et al. | |
| 7,783,632 B2 | 8/2010 | Richardson et al. | 2005/0058433 A1 | 3/2005 | Young | |
| 7,793,319 B2 | 9/2010 | Anderson et al. | 2005/0066370 A1 | 3/2005 | Alvarado et al. | |
| 7,818,763 B2 | 10/2010 | Sie et al. | 2005/0080497 A1 | 4/2005 | Rao | |
| 7,840,112 B2 | 11/2010 | Rao | 2005/0080769 A1 | 4/2005 | Gemmell et al. | |
| 7,895,193 B2 | 2/2011 | Cucerzan et al. | 2005/0086693 A1 | 4/2005 | Shintani | |
| 7,974,962 B2 | 7/2011 | Krakirian et al. | 2005/0102696 A1 | 5/2005 | Westberg | |
| 7,984,467 B2 | 7/2011 | Hansen-Turton | 2005/0108754 A1 | 5/2005 | Carhart et al. | |
| 7,984,468 B2 | 7/2011 | Westberg | 2005/0114885 A1 | 5/2005 | Shikata et al. | |
| 8,046,801 B2 | 10/2011 | Ellis et al. | 2005/0117030 A1* | 6/2005 | Kim | 348/231.1 |
| 8,095,951 B1 | 1/2012 | Kunkel et al. | 2005/0120373 A1 | 6/2005 | Thomas et al. | |
| 8,127,329 B1 | 2/2012 | Kunkel et al. | 2005/0157217 A1 | 7/2005 | Hendricks | |
| 2001/0012439 A1 | 8/2001 | Young et al. | 2005/0158023 A1 | 7/2005 | Takasu et al. | |
| 2001/0024564 A1 | 9/2001 | Young et al. | 2005/0160461 A1 | 7/2005 | Baumgartner et al. | |
| 2001/0027562 A1 | 10/2001 | Schein et al. | 2005/0188402 A1 | 8/2005 | de Andrade et al. | |
| 2001/0044855 A1 | 11/2001 | Vermeire et al. | 2005/0204388 A1 | 9/2005 | Knudson et al. | |
| 2001/0051037 A1 | 12/2001 | Safadi et al. | 2005/0229214 A1 | 10/2005 | Young et al. | |

| | | | | | | |
|---|---|---|---|---|---|---|
| 2005/0229215 | A1 | 10/2005 | Schein et al. | EP | 0408892 A1 | 1/1991 |
| 2005/0240967 | A1 | 10/2005 | Anderson et al. | EP | 0444496 | 9/1991 |
| 2005/0246732 | A1 | 11/2005 | Dudkiewicz et al. | EP | 0447968 | 9/1991 |
| 2005/0251827 | A1 | 11/2005 | Ellis et al. | EP | 0447968 A2 | 9/1991 |
| 2005/0251828 | A1 | 11/2005 | Young et al. | EP | 0472147 | 2/1992 |
| 2005/0251831 | A1 | 11/2005 | Young et al. | EP | 0477756 A2 | 4/1992 |
| 2005/0251836 | A1 | 11/2005 | Young et al. | EP | 0488379 | 6/1992 |
| 2005/0259963 | A1 | 11/2005 | Sano et al. | EP | 0512618 A2 | 11/1992 |
| 2006/0003693 | A1 | 1/2006 | Onomatsu et al. | EP | 0532322 A2 | 3/1993 |
| 2006/0026625 | A1 | 2/2006 | Krakirian et al. | EP | 0536901 | 4/1993 |
| 2006/0026635 | A1 | 2/2006 | Potrebic et al. | EP | 0548286 A1 | 6/1993 |
| 2006/0026665 | A1 | 2/2006 | Rodriguez et al. | EP | 0 560 593 | 9/1993 |
| 2006/0051059 | A1 | 3/2006 | Krakirian et al. | EP | 0 572 090 | 12/1993 |
| 2006/0053449 | A1 | 3/2006 | Gutta | EP | 0775417 A1 | 5/1997 |
| 2006/0075428 | A1 | 4/2006 | Farmer et al. | EP | 0827340 A2 | 3/1998 |
| 2006/0085828 | A1 | 4/2006 | Dureau et al. | EP | 0836321 | 4/1998 |
| 2006/0101490 | A1 | 5/2006 | Leurs | EP | 0 854 645 | 7/1998 |
| 2006/0149709 | A1 | 7/2006 | Krakirian et al. | EP | 0969662 A1 | 1/2000 |
| 2006/0150214 | A1 | 7/2006 | Ramraz et al. | EP | 1213919 | 6/2002 |
| 2006/0173838 | A1 | 8/2006 | Garg et al. | EP | 1363452 A1 | 11/2003 |
| 2006/0174269 | A1 | 8/2006 | Hansen-Turton | EP | 1377049 A1 | 1/2004 |
| 2006/0218573 | A1 | 9/2006 | Proebstel | EP | 1 463 307 A2 | 9/2004 |
| 2006/0218604 | A1 | 9/2006 | Riedl et al. | EP | 1613066 A2 | 1/2006 |
| 2006/0253874 | A1 | 11/2006 | Stark et al. | EP | 1641254 A2 * | 3/2006 |
| 2006/0271953 | A1 | 11/2006 | Jacoby et al. | EP | 1763234 | 3/2007 |
| 2006/0294574 | A1 | 12/2006 | Cha | FR | 2662895 A1 | 12/1991 |
| 2007/0009229 | A1 | 1/2007 | Liu | GB | 1370535 | 10/1974 |
| 2007/0016875 | A1 | 1/2007 | Santos-Gomez | GB | 1554411 A | 10/1979 |
| 2007/0039023 | A1 | 2/2007 | Kataoka | GB | 2034995 A | 6/1980 |
| 2007/0055979 | A1 | 3/2007 | Van Gassel et al. | GB | 2062424 A | 5/1981 |
| 2007/0055989 | A1 | 3/2007 | Shanks et al. | GB | 2126002 A | 3/1984 |
| 2007/0074245 | A1 | 3/2007 | Nyako et al. | GB | 2155713 A | 9/1985 |
| 2007/0078822 | A1 | 4/2007 | Cucerzan et al. | GB | 2185670 A | 7/1987 |
| 2007/0083895 | A1 | 4/2007 | McCarthy et al. | GB | 2210526 A | 6/1989 |
| 2007/0089132 | A1 | 4/2007 | Qureshey et al. | GB | 2217144 A | 10/1989 |
| 2007/0130089 | A1 | 6/2007 | Chiu | GB | 2256546 A | 12/1992 |
| 2007/0136749 | A1 | 6/2007 | Hawkins et al. | JP | 58210776 A | 12/1983 |
| 2007/0162850 | A1 | 7/2007 | Adler et al. | JP | 59-123373 A | 7/1984 |
| 2007/0186240 | A1 | 8/2007 | Ward et al. | JP | 59141878 A | 8/1984 |
| 2007/0277201 | A1 | 11/2007 | Wong et al. | JP | 60061935 A | 4/1985 |
| 2007/0291175 | A1* | 12/2007 | Hsieh ............................ 348/565 | JP | 60069850 | 4/1985 |
| 2008/0066111 | A1 | 3/2008 | Ellis et al. | JP | 60171685 A | 9/1985 |
| 2008/0092155 | A1 | 4/2008 | Ferrone et al. | JP | 61050470 A | 3/1986 |
| 2008/0092156 | A1 | 4/2008 | Ferrone | JP | 61074476 A | 4/1986 |
| 2008/0098431 | A1 | 4/2008 | Young et al. | JP | 61109379 A | 5/1986 |
| 2008/0104057 | A1 | 5/2008 | Billmaier et al. | JP | 61227486 A | 10/1986 |
| 2008/0104127 | A1 | 5/2008 | Billmaier et al. | JP | 62008389 A | 1/1987 |
| 2008/0127261 | A1 | 5/2008 | Ijeomah et al. | JP | 62-049528 A | 3/1987 |
| 2008/0184294 | A1 | 7/2008 | Lemmons et al. | JP | 62-060370 | 3/1987 |
| 2010/0107194 | A1 | 4/2010 | McKissick et al. | JP | 62-060377 A | 3/1987 |
| 2010/0175086 | A1 | 7/2010 | Gaydou et al. | JP | 62060384 | 3/1987 |
| 2010/0180300 | A1 | 7/2010 | Carpenter et al. | JP | 62066493 A | 3/1987 |
| 2010/0180302 | A1 | 7/2010 | Ellis et al. | JP | 62-082325 A | 4/1987 |
| 2010/0325668 | A1 | 12/2010 | Young et al. | JP | 62198768 A | 9/1987 |
| 2011/0164861 | A1 | 7/2011 | Kunkel et al. | JP | 63-023690 A | 1/1988 |
| 2012/0076473 | A1 | 3/2012 | Kunkel et al. | JP | 63-054830 A | 3/1988 |
| 2012/0131616 | A1 | 5/2012 | Kunkel et al. | JP | 63-054884 A | 3/1988 |
| | | | | JP | 63-059075 A | 3/1988 |
| | | FOREIGN PATENT DOCUMENTS | | JP | 63-113662 A | 5/1988 |
| | | | | JP | 63-113663 A | 5/1988 |
| DE | | 2338380 A1 | 2/1975 | JP | 63-113664 A | 5/1988 |
| DE | | 29 18 846 | 11/1980 | JP | 63-124293 A | 5/1988 |
| DE | | 3246225 A1 | 6/1984 | JP | 63-141467 A | 6/1988 |
| DE | | 3337204 | 4/1985 | JP | 63-174484 A | 7/1988 |
| DE | | 3527939 | 2/1987 | JP | 63247812 A | 10/1988 |
| DE | | 36 21 263 A1 | 1/1988 | JP | 63-289979 A | 11/1988 |
| DE | | 3623924 | 2/1988 | JP | 63276069 A | 11/1988 |
| DE | | 3921847 | 1/1991 | JP | 63299582 A | 12/1988 |
| DE | | 42 40 187 | 6/1994 | JP | 64013278 U | 1/1989 |
| EP | | 0051228 | 5/1982 | JP | 01-099122 A | 4/1989 |
| EP | | 0191149 A1 | 8/1986 | JP | 01-120978 A | 5/1989 |
| EP | | 0256295 A2 | 2/1988 | JP | 01-136426 A | 5/1989 |
| EP | | 0300562 | 1/1989 | JP | 01-166678 A | 6/1989 |
| EP | | 0337336 A2 | 10/1989 | JP | 1142918 A | 6/1989 |
| EP | | 0339675 | 11/1989 | JP | 1150928 A | 6/1989 |
| EP | | 0363653 A2 | 4/1990 | JP | 01-184691 A | 7/1989 |
| EP | | 0 393 555 | 10/1990 | JP | 01209399 A | 8/1989 |
| EP | | 0393955 | 10/1990 | JP | 1212986 A | 8/1989 |
| EP | | 0393955 A1 | 10/1990 | JP | 01213853 A | 8/1989 |
| EP | | 0401930 | 12/1990 | | | |

| | | | |
|---|---|---|---|
| JP | 01-276977 A | 11/1989 |
| JP | 01-306962 A | 12/1989 |
| JP | 01307944 A | 12/1989 |
| JP | 02-056791 A | 2/1990 |
| JP | 0281385 | 3/1990 |
| JP | 2113318 A | 4/1990 |
| JP | 02-117288 A | 5/1990 |
| JP | 02-119307 A | 5/1990 |
| JP | 02-146884 A | 6/1990 |
| JP | 02-176968 A | 7/1990 |
| JP | 2189753 A | 7/1990 |
| JP | 02-288571 A | 11/1990 |
| JP | 03-167975 A | 7/1991 |
| JP | 3178278 A | 8/1991 |
| JP | 03-214919 A | 9/1991 |
| JP | 03-243076 A | 10/1991 |
| JP | 04 044475 A | 2/1992 |
| JP | 4044475 | 2/1992 |
| JP | 04-162889 A | 6/1992 |
| JP | 04-180480 A | 6/1992 |
| JP | 05-103281 A | 4/1993 |
| JP | 05-183826 | 7/1993 |
| JP | 05-339100 A | 12/1993 |
| JP | 06-090408 A | 3/1994 |
| JP | 6069850 A | 3/1994 |
| JP | 06-133235 A | 5/1994 |
| JP | 08-137334 A | 5/1996 |
| JP | 8-506469 | 7/1996 |
| JP | 08-196738 A | 8/1996 |
| JP | 1093905 | 4/1998 |
| JP | 10247344 A | 9/1998 |
| JP | 2838892 | 10/1998 |
| JP | 1078328 | 5/2009 |
| WO | WO-87/00884 A1 | 2/1987 |
| WO | WO-8700884 | 2/1987 |
| WO | WO-88/04507 A1 | 6/1988 |
| WO | WO-89/03085 A1 | 4/1989 |
| WO | WO-9000847 | 1/1990 |
| WO | WO-90/07844 A1 | 7/1990 |
| WO | WO-90/15507 | 12/1990 |
| WO | WO-91/06367 A2 | 5/1991 |
| WO | WO-92/04801 | 3/1992 |
| WO | WO-9304473 | 3/1993 |
| WO | WO-9305452 A1 | 3/1993 |
| WO | WO-93/11639 | 6/1993 |
| WO | WO-93/11640 | 6/1993 |
| WO | WO-93/23957 A1 | 11/1993 |
| WO | WO-94/14281 A1 | 6/1994 |
| WO | WO-94/14284 A1 | 6/1994 |
| WO | WO-9413107 A1 | 6/1994 |
| WO | WO-9414282 | 6/1994 |
| WO | WO-94/29811 A1 | 12/1994 |
| WO | WO-95/01056 A1 | 1/1995 |
| WO | WO-95/06389 A1 | 3/1995 |
| WO | WO-9532583 A1 | 11/1995 |
| WO | WO-96/07270 | 3/1996 |
| WO | WO-96/19074 A1 | 6/1996 |
| WO | WO-9617473 A1 | 6/1996 |
| WO | WO-9606605 | 8/1996 |
| WO | WO-96/41478 | 12/1996 |
| WO | WO-9713368 | 4/1997 |
| WO | WO-97/48230 | 12/1997 |
| WO | WO-97/49242 | 12/1997 |
| WO | WO-97/50251 A1 | 12/1997 |
| WO | WO-9806219 A1 | 2/1998 |
| WO | WO-9810589 | 3/1998 |
| WO | WO-98/26584 A1 | 6/1998 |
| WO | WO-9838831 A1 | 9/1998 |
| WO | WO-9945702 A1 | 9/1999 |
| WO | WO-0004709 | 1/2000 |
| WO | WO-0011869 A1 | 3/2000 |
| WO | WO-00/33576 A1 | 6/2000 |
| WO | WO-0033573 A1 | 6/2000 |
| WO | WO-00/59214 | 10/2000 |
| WO | WO-0176249 A1 | 10/2001 |
| WO | WO-01/91458 A2 | 11/2001 |

OTHER PUBLICATIONS

"Expert Report of Dr. Gary S. Tjaden," Dec. 18, 2002.
"Expert Report of Dr. Gary S. Tjaden," May 13, 2002.
"Expert Report of Stephen D. Bristow with regard to validity of U.S. Patent Nos. 5,568,272 and 5,508,815," Jun. 10, 2002.
"JVC Instruction Book: Color TVS C-2018/C-2028/C-2038," JVC Company of America, Elmwood Park, NJ (12 pp.).
"JVC Service Manual: 20" Color TV Model C-2018 (US)," JVC Service & Engineering Company of America, No. 50082, Jan. 1988 (38 pp.).
"JVC Service Manual: 21" Color TV Model C-2018 (CA)," No. 5014, Jun. 1988 (37 pp).
"JVC Service Manual: 26" Color TV Model C-2627 (US)," JVC Service & Engineering Company of America, No. 5947, Apr. 1987 (40 pp.).
"Prevues," Prevue Guide Brochure, Spring 1984.
"Technological Examination & Basic Investigative Research Report on Image Data Bases," Japan Int'l Society for the Advancement of Image Software, Japan, Mar. 1988 (with partial translation).
"The New Media and Broadcast Policy: An Investigation & Research Conference Report on Broadcasting Diversification," Japan Ministry of Posts & Telecommunications, Mar. 1982 (with partial translation).
"Time Teletext" brochure, "Now, Through the Advances of the Computer Age, You Can Get the Information You Want, When You Want It. Instantly and Conveniently, on Your Home TV Screen," Time Inc., undated.
"TV Listings Functional Spec.," Time Video Information Services, Inc., undated.
"Using Videotex to Program Video Cassette Recorders," Broadcast Engineering Reports, vol. 26, No. 6, Nov.-Dec. 1982.
"Wire Delivery," system as described in Cable Data ad, and CableVision index vol. 7, No. 30, Apr. 5, 1982.
386 MAX: L'Espace Retrouve, Microsystems, May 1990 (with full English translation).
Antonoff, M., "Stay Tuned for Smart TV," Popular Science, Nov. 1990, pp. 62-65.
Baer, R.H., "Innovative Add-On TV Products," IEEE Transactions on Consumer Electronics, vol. CE-25, Nov. 1979.
Beddow, David P., "The Virtual Channels Subscriber Interface", Communications Technology, Apr. 30, 1992, pp. 30 and 49.
Bensch, U., "VPV Videotext Programs Videorecorder," IEEE Transactions on Consumer Electronics, vol. 34, No. 3, Aug. 1988, pp. 788-792.
Bestler, C., 42nd Annual Convention & Exposition of the National Cable Television Association, Proceedings from Eleven Technical Sessions, "Flexible Data Structures and Interface Rituals for Rapid Development of OSD Applications," San Francisco, CA., Jun. 6-9, 1993, pp. 223-236.
Brugliera, Vito, "Digital On-Screen Display—A New Technology for the Consumer Interface," Symposium Record Cable Sessions of the 18th International Television Symposium & Technical Exhibition, Jun. 10, 1993, pp. 571-586.
CableVision Advertisement for "TV Decisions," vol. 11, No. 38, Aug. 4, 1986.
Came, E.B., "The Wired Household," IEEE Spectrum, vol. 16, No. 10, Oct. 1979, pp. 61-66.
Christodoulakis, S. et al., "Browsing Within Time-Driven Multimedia Documents," Conference on Office Information Systems, Palo Alto, CA., publication of the Institute for Computer Research, University of Waterloo, Waterloo, Ontario, Canada, Mar. 23-25, 1988.
Daily Variety Article "Replay to bow 'instant VCR' New digital TV recorder due in Nov. from Replay" by Paul Karon, published on Sep. 8, 1998.
Daily, M., "Addressable Decoder with Downloadable Operation," 42nd Annual Convention and Exposition of the National Cable Television Association, Proceedings from Eleven Technical Sessions, San Francisco, CA., Jun. 6-9, 1993, pp. 82-89.
Damouny, N.G., "Teletext Decoders—Keeping up with the Latest Technology Advances," IEEE Transactions on Consumer Electronics, vol. CE-30, No. 3, Aug. 1984, pp. 429-436.
Decision of Technical Board of Appeal 3.4.2, T 1158/01-3.4.2, Jul. 13, 2004, Official Journal EPO.
Decisions of the Enlarged Board of Appeal G 2/98, Official Journal EPO, May 31, 2001.
DIP II Program Guide, systems as described in DIP II ad.

DIRECTTV Receiver with TiVO, Viewer's Guide (2000).
Edmondson et al., "NBC Switching Central," SMPTE Journal, Oct. 1976, vol. 85, No. 10, pp. 795-805.
Edwardson, S.M. et al., "CEEFAX: A Proposed New Broadcasting Service," SMPTE Journal, Jan. 1974, vol. 83, No. 1, pp. 14-19.
Eitz et al., "Videotext Programmiert Videoheimgeräte (VPV)," Rundfunktech. Mitteilungen, vol. 30, No. 5, Sep. 11, 1986, pp. 223-229.
Hallenbeck's Cross Examination Transcript Day 7, between Gemstar-TV Guide International Inc. et al and Virgin Media Limited et al. dated Jun. 19, 2009.
Hallenbeck's Cross Examination Transcript Day 8, between Gemstar-TV Guide International Inc. et al and Virgin Media Limited et al. dated Jun. 23, 2009.
Hallenbeck's Witness Statement 1, dated Feb. 3, 2009.
Hallenbeck's Witness Statement 2, dated Feb. 13, 2009.
Hallenbeck's Witness Statement 3, dated May 6, 2009.
Hallenbeck's Witness Statement 4, dated May 11, 2009.
Hallenbeck's Witness Statements Exhibit PDH 1 "Contractual Agreement Between Systems Consultants and Triple D Incorporated," Triple D, Inc. Publishers of STV Magazine, OnSat and Satellite Retailer, May 10, 1985.
Hallenbeck's Witness Statements Exhibit PDH 10 Hallenbeck et al., "Personal Home TV Programming Guide," IEEE 1990 International Conference on Consumer Electronics, Digest of Technical Papers, Jun. 6-8, 1990.
Hallenbeck's Witness Statements Exhibit PDH 11 "Mock up of Hallenbeck's "hack" grid display" (undated).
Hallenbeck's Witness Statements Exhibit PDH 2 "SuperGuide—The Satellite Programming Guide."
Hallenbeck's Witness Statements Exhibit PDH 3 "OnSat" Canada's Weekly Guide to Satellite TV, Nov. 15-21, 1987, pp. 1-18.
Hallenbeck's Witness Statements Exhibit PDH 4 "STV A Revolutionary Product 'Electronic Publishing Comes of Age'" by John Gurney, May 1987.
Hallenbeck's Witness Statements Exhibit PDH 5 "Come Join Us at the Largest and Most Spectacular Satellite TVRO Show in the World! SPACE/STTI Las Vegas Show '86," 'Las Vegas Convention Center, Las Vegas Nevada'Feb. 19-21, 1986.
Hallenbeck's Witness Statements Exhibit PDH 6 "SPACE/STTI Nashville Show 'The Nashville Show Agenda'", Sep. 1-3, 1986 pp. 1-22.
Hallenbeck's Witness Statements Exhibit PDH 7 "Satellite Television Technology International SBCA/STTI Present Nashville!" Brochure, Jul. 9-11, 1990, vol. 2, pp. 1-36.
Hallenbeck's Witness Statements Exhibit PDH 9 "OnSat—America's Weekly Guide to Satellite TV," Jun. 10-16, 1990, pp. 1-3.
Hedger, J., "Telesoftware: Home Computing Via Broadcast Teletext," IEEE Transactions on Consumer Electronics, vol. CE-25, No. 3, Jul. 1979, pp. 279-287.
Heller, A., "VPS—Ein Neues System Zur Beitragsgesteuerten Programmaufzeichnung,", (translation by Lawyers and Merchants Translation Bureau, Inc.), Fundfunktechnische Mitteilungen, Issue 4, Jul. 1985 (with full English language translation).
Hofmann et al., "Videotext Programmiert Videorecorder," Rundfunktech. Mitteilungen, Sep. 17, 1982, 9 pages (with full English language translation attached).
IBM Technical Disclosure Bulletin on "Combined-User Interface for Computers, Television, Video Recorders, and Telephone, Etc.," vol. 33, No. 3B, Aug. 1990, pp. 116-118.
Insight Telecast—various publications, 1992 and 1993.
James, A., "Oracle-Broadcasting the Written Word," Wireless World, Jul. 1973, pp. 314-316.
Jerrold Communications Publication, "Cable Television Equipment," dated 1992 and 1993 pp. 8-2.1 to 8-6 and 8-14.1 to 8-14.3.
Judice, C.N. "Move Over Cable, Here Comes Video Via Voice Lines," Network World, Sep. 1, 1986, p. 26.
Karstad, K., "Microprocessor Control for Color-TV Receivers," IEEE Transactions on Consumer Electronics, vol. CE-26, No. 2, May 1980, pp. 149-155.

Kornhaas W.: "Von der Textprogrammierung über TOP zum Archivsystem" Radio Fernsehen Elektronik., vol. 40, No. 8, Aug. 30, 1991, pp. 465-468, (XP000240875 Veb Verlag Technik. Berlin, DE ISSN: 1436-1574).
Krüger, H. E., "Das Digitale Fernsehkennungssystem ZPS (Digital Video Identification System VIS)," Fernsehtechnik, vol. 35, No. 6, 1982, pp. 368-376.
Las Vegas Review—Journal/Sun "Are You Ready for New VCR Techology?" Jan. 27, 1991.
Long, M.E., "The VCR Interface", 1986 NCTA Technical Papers, pp. 197-202.
Lowenstein, R.L. et al., "The Inevitable March of Videotex," Technology Review, vol. 88, No. 7, Oct. 1985, pp. 22-29.
Mannes, G., "List-Mania, On-Screen, interactive TV guides that can program your VCR are just around the corner", Video Review, May 1992, pp. 34-36.
Mannes, G., "Smart Screens: Development for Personal Navigation Systems for TV Viewers,"Video Magazine, vol. 17, No. 9, Dec. 1993.
McKenzie, G.A., "Oracle—An Information Broadcasting Service Using Data Transmission in the Vertical Interval," Journal of the SMPTE, vol. 83, No. 1, Jan. 1974, pp. 6-10.
Merrell, R.G., "Tac-Timer," 1986 NCTA Technical Papers, pp. 203-206.
Newman, Blair, "The Home Bus Standard," publication date Jul. 22, 1988.
NHK Monthly Report on Broadcast Research, "Facsimile Transmission—Various Articles," Dec. 1987, pp. 1-74 (with partial English translation attached).
P. 12 of Phillips TV 21SL5756/00B User Manual.
Pfister, Larry T., "TeleText: Its Time Has Come," Prepared for the IGC Videotex/Teletext Conference, Andover, Massachusetts, Dec. 1982.
Philips Consumer Electronics, User's Manual, Colour Television, 25GR5765, etc.
Philips Consumer Electronics, User's Manual, MatchLine, Colour Television, 28DC2070, 33DC2080.
Printed materials on "Time's Teletext Service," 1982-1983, pp. V79175, V79142, V79143, V79148, and V79151.
Rayers, D.J., "Telesoftware by Teletext," 1984 IEEE Conf. Papers, vol. 240, 3 pages.
Re-Amended Grounds of Invalidity Under CPR Rule 17.1(2)(a), final version, served by Virgin Media dated May 13, 2009.
Roizen, Joseph, "Teletext in the USA," SMPTE Journal, Jul. 1981, pp. 602-610.
Sanyo Technical Review, "VPT System for VHS VCR," vol. 22, No. 1, Feb. 1990 (with English language abstract attached).
Satellite Service Company, "Super Guide IQ® SG 1000," User and Installation Manual, Section I-IV, undated.
Schlender, B.R., "Couch Potatoes! Now Its Smart TV," Fortune, Nov. 20, 1989, pp. 111-116.
Sealfon, Peggy, "High Tech TV," Photographic, Dec. 1984.
Sommerhäuser, W., "Video Programm System: Flexibel Programmieren mit VPS," Funkschau, No. 25, Dec. 1985, pp. 47-51.
Sugimoto, S. et al., "Computer Network: Current Status and Outlook on Leading Science and Technology," Bureau of Science & Technology (Japan),vol. 1, Dec. 1986 (with partial translation).
Sunada, K. et al. "Teletext Color Television Receiver Model C-29M950, C26M940," NEC Technical Journal, vol. 40, No. 8, Serial 216, Sep. 1987, pp. 9-21.
Symposium Record Broadcast Sessions, 14th International TV Symposium, Montreux, Switzerland, Jun. 6-12, 1985, 9 pages.
TV Guide, San Francisco Metropolitan Schedule, Feb. 6, 1989.
Universal Remote Control, Realistic—Owners Manual, Radio Shack, 1987.
User's manual for Trinitron Colour Television model Nos. KV-A2931D, KV-A2531D and KV-A2131D, Sony Corporation, 1993.
Van Barneveld at el, "Designing Usable Interfaces for TV Recommender Systems," Personalized Digital Television, 6:259-286 (2004).
Veith R.H., "Television's Teletext," Elsevier Science Publishing Co., Inc., 1983, pp. 13-20, 41-51.

Z-TAC, Zenith Corp., undated material received from Media General.

Zeisel et al., "An Interactive Menu-Driven Remote Control Unit for TV-Receivers and VC-Recorders," IEEE Transactions on Consumer Electronics, vol. 34, No. 3, Aug. 1988, pp. 814-818.

"Description of Digital Audio-Visual Functionalities," Digital Audio-Visual Council, DAVIC 1.3.1 Specification Part 1, Technical Report, 1998, 86 pages.

Berniker, M., "TV Guide Going Online," Broadcasting & Cable, Jun. 13, 1994, pp. 49-52.

Cable Data: Via Cable, Addressable Converters: A New Development at CableData, vol. 1, No. 12, Dec. 1981, 11 pages.

Davis, B., TV Guide on Screen, "Violence on Television," House of Representatives, Committee on Energy and Commerce, Subcommittee o Telecommunications and Finance, Jun. 25, 1993, pp. 93-163.

December, J., Presenting JAVA, "Understanding the Potential of Java and the Web," © 1995 by Sams.net Publishing, pp. 1-208.

Eckhoff, J., "TV Listing Star on the Computer," Central Penn Business Journal/High Beam Research, Mar. 15, 1996, pp. 1-4.

Philips TV set, model No. 25 PT 910A, User Manual, 40 pages (undated).

Uniden, UST-4800, Integrated Receiver/Descrambler, Installation Guide, © 1990, Uniden America Corporation, 60 pages.

Uniden, UST-4800, Integrated Receiver/Descrambler, Operating Guide, © 1990, Uniden America Corporation, 24 pages.

Uniden, UST-4800, Super Integrated Receiver/Descrambler, Preliminary Reference Manual, Nov. 12, 1991, 80 pages.

"Blue Lagoon," Don Snyder Demo Videotape on TVIS System, San Diego & Orlando Broadcast, 1983, Screen Shot (V79390) (submitted on DVD).

* cited by examiner

SYSTEMS AND METHODS FOR PROVIDING A SCAN TRANSPORT BAR

BACKGROUND OF THE INVENTION

This invention is directed to systems and methods for providing a scan transport bar in video entertainment systems.

Interactive media guidance applications, such as interactive television program guides, are well known in the art. One known guidance feature is a channel scan. Channel scan features generally allow users to initiate a tuning sequence that proceeds from channel to channel without requiring the user to repetitively issue channel change commands. During a channel scan, a guidance application pauses on each channel for a period of time to allow the user to see what is on. Some scans do not tune sequentially, and instead allow users to scan programs that are, for example, only of a certain category or based on user criteria. Regardless of the type of scan, users may find scanning unwieldy because, for example, there are too many channels in the scan. Thus, what is needed is a mechanism for allowing users to easily navigate within a scan.

SUMMARY OF THE INVENTION

In accordance with the principles of the present invention, systems and methods are provided for enhanced scan navigation in interactive media guidance applications, such as interactive television program guides. The invention is an onscreen scan transport bar, provided by an interactive media guidance application, that allows users to navigate more easily within a scan while viewing contents of the scan. The transport bar includes a plurality of cells, each of which indicates a program that is part of the scan. The cells may indicate programs using any suitable approach. In some embodiments, titles, channel numbers and text descriptors of programs are used. In other embodiments, programs may be represented by graphics or video clips. An additional advantage of the transport bar is that the user is presented, and may retrieve, information about programs in the scan other than the currently tuned-to program.

Users may navigate within the scan by selecting a program from the transport bar. In some embodiments, the transport bar includes a highlight or other indicator that may be positioned on a cell within the transport bar for selection. In some embodiments, the interactive media guidance application assigns tuning sequence numbers to programs associated with cells of the transport bar. The interactive media guidance application tunes to a program in response to a user entering the tuning sequence number. The interactive media guidance application may assign tuning sequence numbers using any suitable approach. For example, numbers may be assigned uniquely to each program within a scan. Alternatively, a limited number of tuning sequence numbers may be used and reused. Such an approach, while limiting the user's ability to tune to all programs in the scan, may be more user friendly for some users as it does not require a user to attempt to remember more tuning indicators than practical. The use of tuning sequence numbers to easily navigate among assets may be used in contexts other than scanning. For example, it may be used in transport bar embodiments for navigating within DVR or VOD assets to support chaptering, or in transport bar embodiments for navigating playlists.

The transport bar may have one or more rows of any suitable number of cells. The number of cells may be chosen to, for example, accommodate different cell sizes. As the scan progresses, the cells change to indicate the current, recently viewed, and upcoming programs of the scan. For example, a single row of cells may be provided that shift from one side of the screen to the other. As the scan progresses, the cell for the program viewed earliest in the scan drops off the screen to make room for additional cells, and a cell for a current or future program appears. In approaches where multiple rows of cells are provided, a serpentine approach may be used to rotate cells much like the rotation of players on a volleyball court—one corner cell drops off as another enters and the other cells shift in an "S" pattern.

In some embodiments, the interactive media guidance application intelligently orders programs within the scan. For example, programs may be ordered based on how soon they will end. Or, as another example, programs may be sorted within the scan based on other characteristics, such as whether they are HD, how much time is remaining, and whether the program is a rerun.

The interactive media guidance application may indicate how much time remains before it tunes to the next program in the scan. For example a countdown timer may be included in the transport bar or elsewhere on the display. In some embodiments, the countdown timer is included in the cell of the current program of the scan.

The transport control bar may also provide the user with the ability to adjust the speed and/or direction of the scan. For example, on-screen or remote-control based fast-forward and rewind buttons may be provided. In response to the user selecting the fast-forward button, the interactive media guidance application speeds up the time to the next tune and, if the button continues to be pressed or selected, makes the next tune. As the fast-forward progresses, the countdown timer advances accordingly. In response to the user selecting the rewind button, the interactive media guidance application will reverse the scan and, if the button continues to be pressed or selected, will tune back to the last program in the scan. As the rewind progresses, the countdown timer reverses accordingly.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Although the embodiments described below may refer to scanning channels in broadcast digital or analog television systems, it is to be clearly understood that the systems and methods of the invention may be used with any suitable video or audio content (e.g., on-demand or recorded content) in any suitable media system (e.g., satellite, on-demand, and IPTV system) having a defined sequence for accessing content sources.

As used herein, the term "tune" or "tuning" refers to the steps of acquiring and displaying a specific content stream or selection accessible by a user's user equipment. For traditional analog television systems, tuning may include acquiring or locking onto a particular channel carrier frequency. For digital television systems, tuning may include demodulating the digital carrier frequency, forward-error correction (FEC) decoding the demodulated transport stream (TS), demultiplexing the transport stream and filtering and separating out particular packet identifiers (PIDs). In switched digital video (SDV) systems, it may also include determining the QAM associated with a channel, or requesting a channel be switched into the system. For IPTV, tuning may include opening a socket and joining a particular multicast group. For recorded content, tuning includes locating content on a storage device (e.g., by reading a file access table (FAT) for information stored on the storage device).

As also used herein, content or channel "scanning" refers to automatically tuning through a series of content selections or channels (e.g., an automatic progression up, down, or in a random, a dynamically, or a statically determined sequence through a number of channels).

Figure 1:
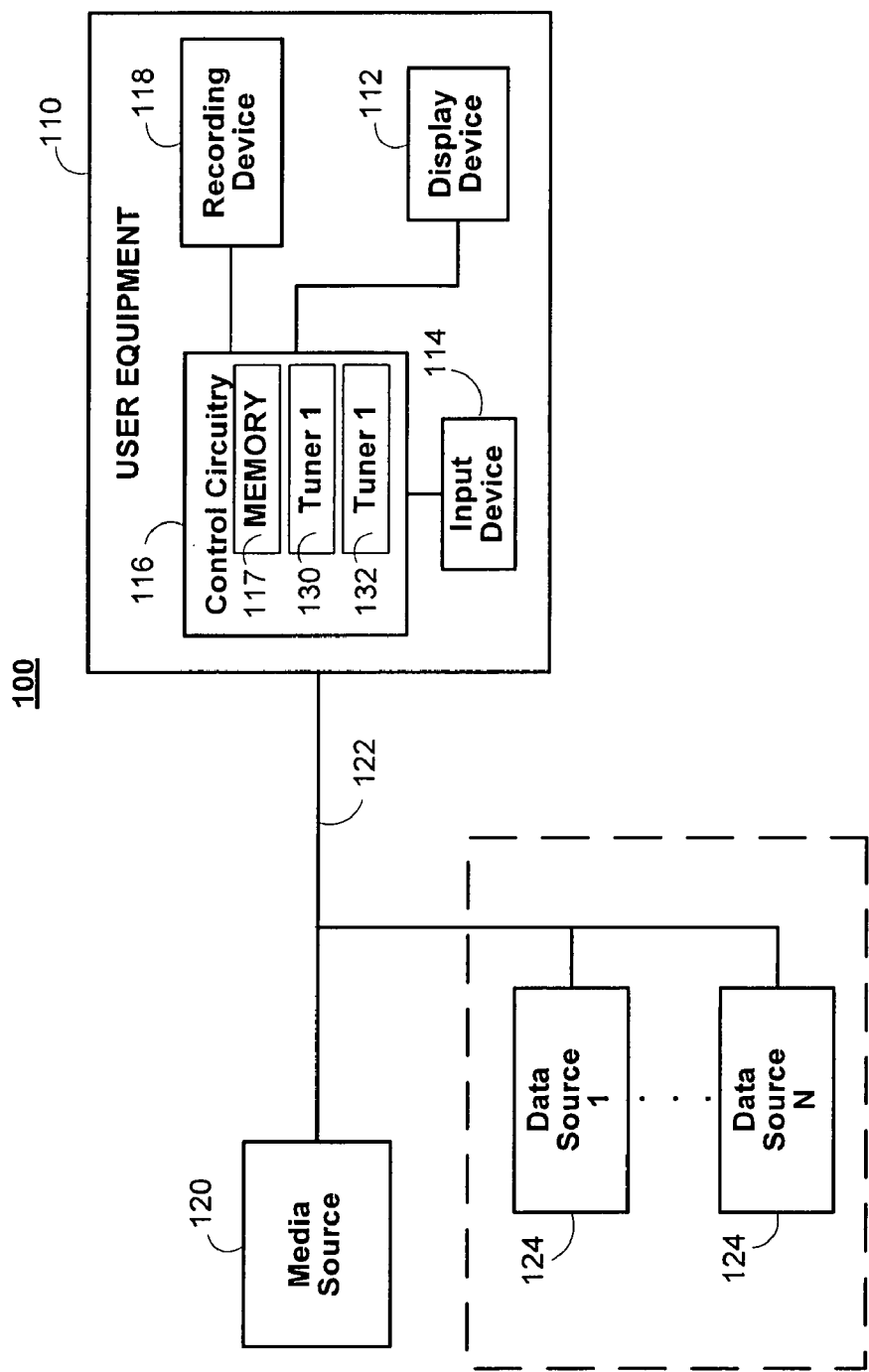
FIG. 1 is a diagram of an illustrative interactive media system in accordance with one embodiment of the present invention.

FIG. 1 shows illustrative interactive media system 100 in accordance with one embodiment of the invention. User equipment 110 receives media in the form of signals from media source 120 over communications path 122. In practice there may be multiple media sources 120 and user equipment 110, as well as multiple communication paths 122, but only one of each has been shown in FIG. 1 to avoid over-complicating the drawing.

Media source 120 may be any suitable media source such as, for example, a cable system headend, satellite media distribution facility, media broadcast facility, internet protocol television (IPTV) headend, on-demand server (e.g., a traditional VOD server or a remote recording server), website, game service provider (e.g., for online gaming) switched digital video server, or any other suitable facility or system for originating or distributing media. Media source 120 may be configured to transmit signals over any suitable communications path 122 including, for example, a radio-frequency broadcast path, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing the instructions of an interactive media guidance application such as, for example an online interactive media guidance application which includes a scan feature.

User equipment 110 may include any equipment suitable for providing an interactive media experience. User equipment 110 may include television equipment such as a television, set-top box, recording device, video player, user input device (e.g., remote control, keyboard, mouse, touch pad, touch screen or voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a fixed electronic device such as, for example, a gaming system (e.g., X-Box, PlayStation, or GameCube) or a portable electronic device, such as a portable DVD player, a portable gaming device, a cellular telephone, a PDA, a music player (e.g., MP3 player), or any other suitable fixed or portable device.

In the example of FIG. 1, user equipment 110 includes at least control circuitry 116, display device 112, user input device 114, and recording device 118 which may be implemented as separate devices or as a single device.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the interactive media guidance application. Display device 112 may also be configured to provide for the output of audio.

Recording device 118 may include a hard drive (e.g., one or more ATA, SCSI, IDE, or IEEE 1394 drives), digital video recorder (DVR), personal video recorder (PVR), or any other device capable of storing media content. Control circuitry 116 may access stored content (e.g., programs and movies) on recording device 118 and cause the content to be presented on display device 112 at any suitable time. Recording device 118 may include one or more tuners. In some embodiments, recording device 118 may be omitted.

Control circuitry 116 is adapted to receive user inputs from input device 114 and execute the instructions of the interactive media guidance application (e.g., a 68000 series processor to perform the instructions corresponding to elements of the flowcharts shown in FIGS. 3-6c and described below). Control circuitry 116 may include one or more tuners 130 and 132 (e.g., analog or digital tuners), encoders and decoders (e.g., MPEG decoders), processors (e.g., MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player).

Tuners 130 and 132 may include one or more analog or digital tuners, network sockets (for IPTV systems), MPEG encoders/decoders, or other suitable audio/video circuitry for performing a scan under the control of an interactive media guidance application executed by control circuitry 116. Tuners 130 and 132 may also include decoding/encoding circuitry for converting over-the-air or cable analog signals to MPEG signals for storage or for decoding digital audio and video signals. The tuning and encoding/decoding circuitry may be used by user equipment 110 to receive and display, play, or record a particular television, music, or on-demand channel or any other desired audio and video content (e.g., video requested from network-based or local digital video recorders).

Control circuitry 116, under the control of interactive media guidance application logic, may scan video by directing tuners to sequentially or successively tune, acquire, and decode any suitable content accessible by user equipment 110. For example, user equipment 110 may include tuner 130, a first analog tuner used to acquire analog television signals, and tuner 132, a second digital tuner used to acquire and decode digital television signals. Control circuitry 110 may store or buffer one or more frames of video from tuners 130 and 132 to memory 117 or recording device 118.

In some embodiments, user equipment 110 may also include graphics circuitry (e.g., incorporated within control circuitry 116). The graphics circuitry may include video and/or audio transcoding circuitry, one or more graphics processors, memory, and various display outputs (e.g., S-Video and composite video outputs). The graphics circuitry may also include video compression and scaling codecs or circuitry to scale the input from tuners 130 and 132 (or from some other device, such as recording device 118) to a resolution or size other than the input's native resolution or size. For example, using the graphics circuitry, the input to tuners 130 and 132 may be displayed at a smaller size on display device 112 than their native size in order for program listings information to be presented with the tuner content on the same display screen. As another example, the graphics circuitry may present full-motion or still frame thumbnail windows corresponding to one or more tuner inputs on the same display screen. The graphics circuitry may scale one video input at a time or scale more than one video input simultaneously. For example, the inputs of both of the tuners may be scaled simultaneously so that these inputs may be displayed together on the same display screen in real-time (perhaps with program listings information, content suggestions, or other suitable information). Or, for example, cells of the scan transport bar may include video frames captured from the sources included in the scan.

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data sources 124. But for the clarity of the figure, the equipment of only a single user is shown. The equipment of the plurality of users may be connected to media source 120 and data source 124 using a cable television network, a satellite television network, a local area network (LAN), a wireless network, the Internet, or any other suitable means. In some embodiments, the equipment of the plurality of users may be connected to each other using any suitable means.

User equipment 110 may receive interactive media guidance application data (e.g., titles, descriptions, rating information, etc.) from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive television program guide. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

Scans may be initiated by the interactive media guidance application in response to any suitable event. For example, the interactive media guidance application may receive a key or key sequence entered by the user with input device 114 (FIG. 1) associated with a "scan" instruction, or the interactive media guidance application may receive a user selection of an appropriate option from an interactive media guidance application screen.

Upon initiating a scan, the interactive media guidance application will, in some embodiments, determine which sources should be included in the scan. In some embodiments, the interactive media guidance application may select the programs based on some criteria provided or selected by the user, or automatically employed by the interactive media guidance application. Approaches for allowing users to specify scan criteria are described, for example, in Ellis et al. U.S. Pat. No. 5,986,650, Yuen et al. U.S. Pat. No. 5,673,089, and Kunkel et al. U.S. patent application Ser. No. 11/431,143, filed May 8, 2006, which are hereby incorporated by reference herein in their entireties. For example, the interactive media guidance application may identify the programs currently available from media source 120 (FIG. 1) using the data provided by data source 124 (FIG. 1), and select the programs of media source 120 having data that satisfies the applicable criteria (e.g., a theme, actor, whether a program is available in HD, etc.). The programs that the interactive media guidance application selects may be currently available programs such as, for example, broadcast/satellite programs, on-demand programs, recorded programs, or any other current program. The interactive media guidance application then, in some embodiments, sets a scan sequence for the selected programs (e.g., orders the programs by channel number, start-time, end-time, program length, or proximity of program to criteria). In some embodiments, the interactive media guidance application determines all of the programs for one iteration of the scan when a scan is initiated. In other embodiments, the interactive media guidance application determines the "next" program of a scan just prior to making a successive tune.

Figure 2:
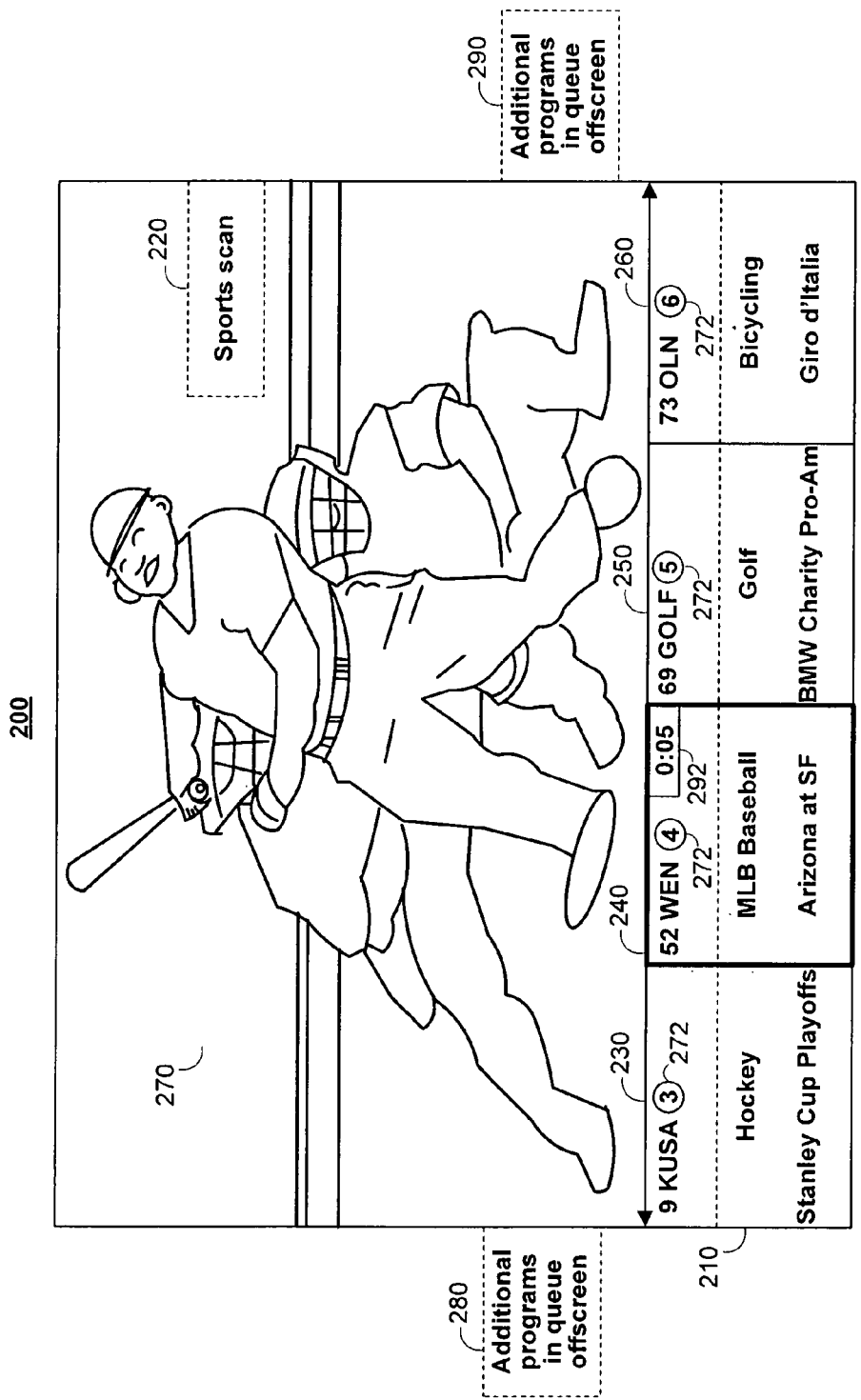
FIG. 2 shows an illustrative scan transport bar overlaid onto television programming in accordance with one embodiment of the present invention.

The interactive media guidance application provides a scan transport bar for allowing a user to easily navigate within a scan. FIG. 2 shows illustrative display 200 having scan transport bar 210 overlaid onto television programming (i.e., a substantial portion of the program is simultaneously displayed with the transport bar). It should be noted that in other embodiments, the television programming may be displayed in a video window. In this example, the interactive media guidance application performs the scan in accordance with user-supplied criteria, namely "sports," as indicated by indicator 220.

Scan transport bar 210 has a number of cells, in this example four displayed cells 230, 240, 250 and 260, but any suitable number of cells may be used. Each cell includes information identifying or relating to a program in the scan, which in this example includes title, description, channel number and call letters. In some embodiments the cells may include other program-related information, or information that is independent of the program. For example, the interactive media guidance application may display information about the scan criteria, advertisements, or program listings. In embodiments where the transport bar cells contain scan criteria, indicator 220 may not be necessary.

The interactive media guidance application may build the scan transport bar 210 by displaying one cell at a time upon successive tunes until the maximum number of cells is reached. Alternatively, the interactive media guidance application initially displays the maximum number of cells. After displaying the first cell or initial group of cells, subsequent cells may enter the display from one side, and already-displayed cells may shift right to left (or left to right) to make room for the new cell. In yet another embodiment, the scan transport bar includes multiple rows of cells. In such embodiments, a serpentine approach may be used to rotate cells much like the rotation of players on a volleyball court—one corner cell drops off as another enters and the other cells shift in an "S" pattern.

In some embodiments the scan transport bar may include a timer 292. Timer 292 counts down the remaining time the current program will be displayed. Or, put another way, the time until the next tune occurs. When the scan timer times out (e.g., reaches zero), the interactive media guidance application tunes to the next source of the next program in the scan sequence and displays the next program in video area 270.

In some embodiments the interactive media guidance application may allow the user to set the timer duration. For example, the interactive media guidance application may allow the user to enter a timer duration using input device 114. In other embodiments the interactive media guidance application sets the timer duration to some predetermined default (e.g. five seconds).

After the interactive media guidance application tunes to a source (e.g., channel), displays the program, and includes a cell for the program in the transport bar, the scan length timer begins to count down. The interactive media guidance application also highlights the cell associated with the program (in this example, cell 240).

After timer 292 counts down to zero, the interactive media guidance application also shifts the transport bar. In this example, the interactive media guidance application shifts in a new program into cell 260 (e.g., channel 75, ESPN, which carries "NFL: Giants vs. Patriots" (not shown)). The program that was in cell 260 moves into cell 250. The program that was in cell 250 moves into cell 240. The program that was in cell 240 moves into cell 230. The program in cell 230 moves off screen. The interactive media guidance application keeps the highlight on cell 240, but now the program is different. Also, timer 292 is reset. This process continues until all the programs in the scan are previewed or until the user requests the transport bar to end. In some embodiments, the scan may begin again automatically after the last program in the sequence is viewed.

Alternatively, the interactive media guidance application may shift in cells only after all the programs indicated in the current cells of the bar are displayed. In such an embodiment, the application moves the highlight and timer over to the next cell and starts the timer again in the next cell without shifting in more programs. Once all the programs are displayed for the current set of cells another set of program cells are shifted in. For example, four programs may be shifted into transport bar 210.

At any time while the scan transport bar is displayed the user may easily navigate to a program in the scan in a number of different ways. The user may highlight a cell using navigation keys (e.g., right and left arrows) on the input device 114. Or, the user may select a program to view in video area 270 by inputting a sequence number 272 into input device 114 (FIG. 1). In such embodiments, the user may access additional information about programs in the scan (whether tuned or not) by highlighting and selecting cells of the transport bar. In the example of FIG. 2, the interactive media guidance application places sequence number 272 at the tops of the cells. Alternatively, the application may put the sequence number at the bottom of the screen or anywhere else inside the cells. In response to the user inputting sequence number "three," cell 230 would become highlighted (removing the highlight from cell 240) and the interactive media guidance application would direct tuner 130 or 132 (FIG. 1) to tune to channel 9.

In the example of FIG. 2, the left-most cell contains sequence number "3." This indicates to the user that the scan transport bar contained two other cells and subsequently shifted them off the screen to make room for additional cells. In other embodiments the interactive media guidance application may display indicator 280 (shown off screen in FIG. 2) to indicate that programs of the screen have already been viewed. Additionally, the interactive media guidance application may add indicator 290 (shown off-screen in FIG. 2) to indicate that there are more programs in the scan. In some embodiments the interactive media guidance application may display the exact number of programs currently off the screen in indicators 280 and 290 when such indicators are included in the display.

Figure 3:
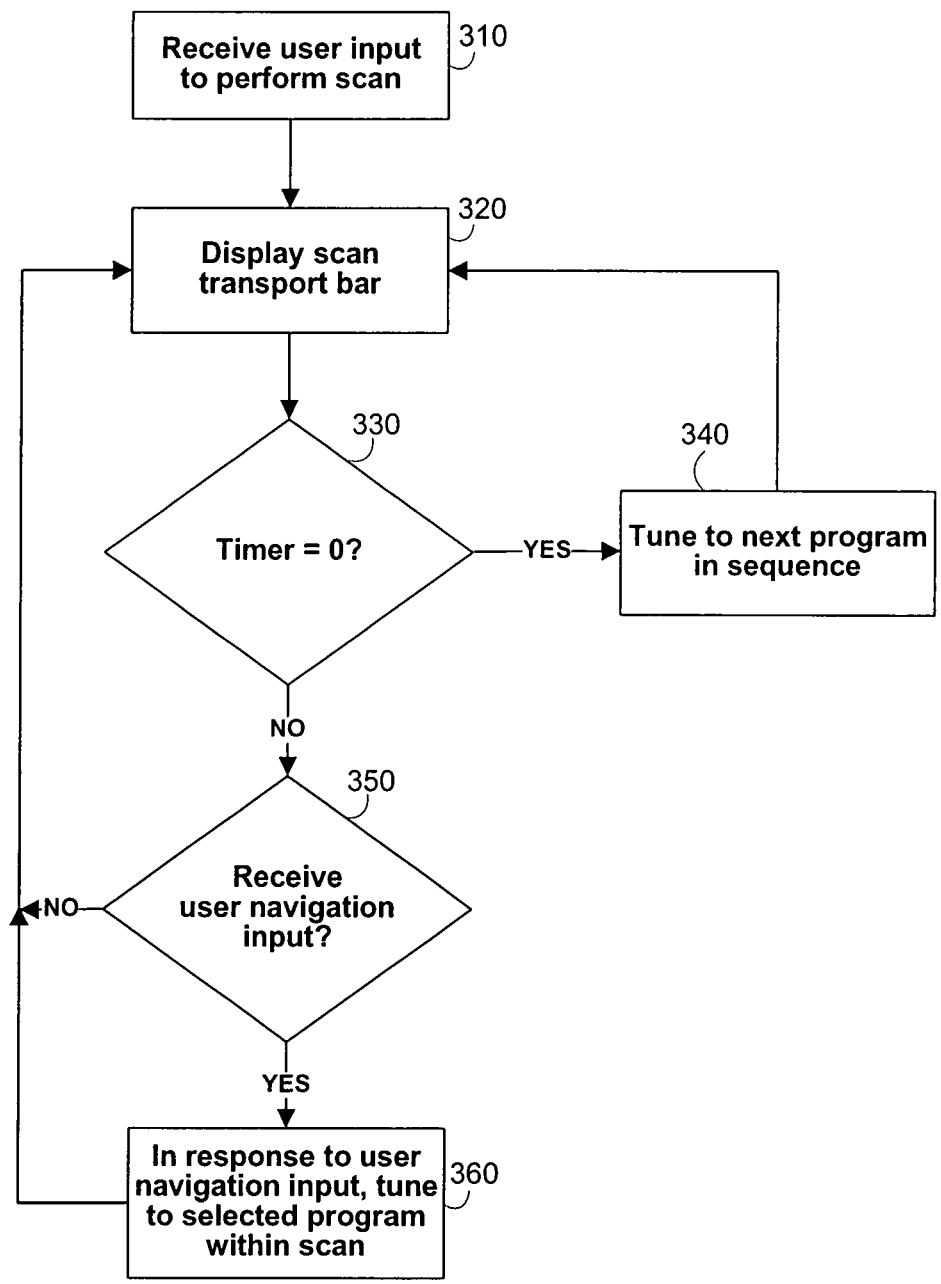
FIG. 3 is a flow chart of an illustrative process for allowing users to navigate a scan using a scan transport bar, in accordance with one embodiment of the present invention.

FIG. 3 shows illustrative general process 300 for providing a scan transport bar in accordance with some embodiments of the present invention. Process 300 begins at step 310, where the application receives a user input to perform a scan. At step 320 the application displays an onscreen transport bar having one or more cells of information regarding programs on sources that are part of the scan. In some embodiments the application creates one cell at a time as the scan progresses, forming the transport bar one cell at a time. In other embodiments the application creates the transport bar multiple cells at a time (e.g., five). At step 330, the interactive media guidance application determines whether it is time to make the next tune in the scan (e.g., by determining that countdown timer 292 (FIG. 2) hits 0). In response to determining it is time to tune, the application directs tuner 130 or 132 (FIG. 1) to tune to the next program in the sequence (step 340) and returns to step 320. At step 350 the application determines whether a user navigation input for the transport bar is received. The input may be, for example, the sequence number for a cell as illustrated in FIG. 2, or a command positioning the highlight on another cell in the transport bar. At step 360 the interactive media guidance application tunes to the selected program, and returns to step 320.

Figure 4:
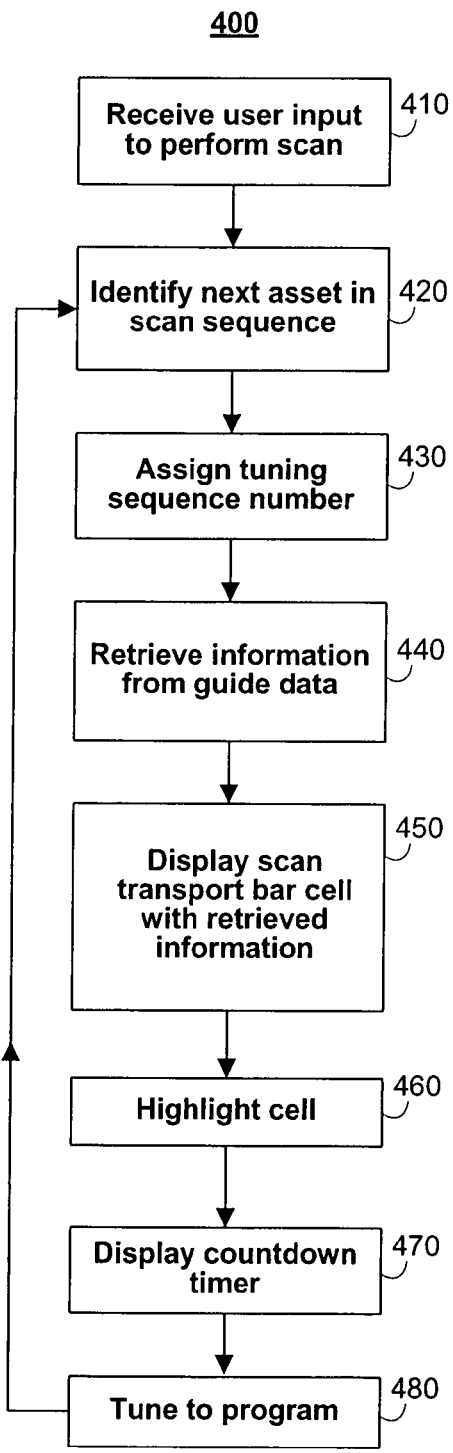
FIG. 4 is a flowchart of an illustrative process for building the initial display of the scan transport bar.

FIG. 4 shows an illustrative process 400 for generating the scan transport bar in accordance with some embodiments of the present invention. The process begins at step 410, where the interactive media guidance application receives a user input to perform a scan. In response, the interactive media guidance application identifies the next asset (i.e., program or source) in the scan timing sequence (step 420). At step 430, the interactive media guidance application assigns a scan tuning sequence number to allow quick navigation to assets within the scan. At step 440, the interactive media guidance application retrieves information from its program guide data (e.g., program guide data stored in memory 117 of FIG. 1) for populating the cell of the scan transport bar for the asset. The information may include, for example, identifying indicia for the source and program (title, source name, call letters, etc.), or unrelated information (e.g., advertisements). At step 450, the interactive media guidance application displays the scan transport control bar cell with the retrieved information. The interactive media guidance application highlights the cell (step 460), displays the countdown timer for the cell (step 470), directs the tuner (e.g., tuner 130 or 132 (FIG. 1)) to tune to the asset (step 480), and returns to step 420 to display the next cell.

The steps of FIG. 4 may be performed in any suitable order depending on the chosen embodiment for displaying the scan transport control bar. For example, steps 420-450 may be performed for each cell of multiple cells before the interactive media guidance application proceeds to step 460 and highlights one of the cells. In such an approach, step 480 may return to step 460 forming a loop that is performed for each cell.

Figure 5:
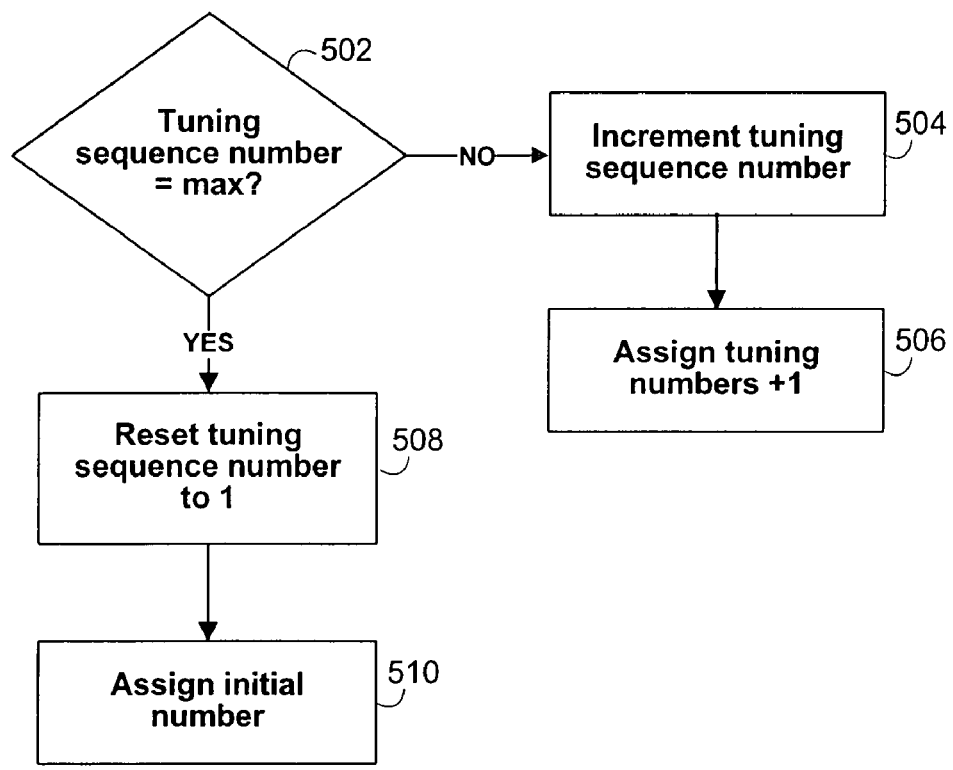
FIG. 5 is a flow chart of an illustrative process for assigning tuning sequence numbers to the programs of the scan sequence in accordance with one embodiment of the present invention.

FIG. 5 shows illustrative steps for generating a tuning sequence number, such as is done at step 430 of FIG. 4. In this embodiment, a maximum number of tuning sequence numbers is presumed. While setting a maximum number of tuning sequence numbers may limit the user's ability to tune immediately to all programs in the scan, it may be more user friendly for some users as it does not require a user to remember more tuning sequence numbers than practical. A maximum tuning sequence number of nine or less may also allow the user to quickly select a program from the scan with a single keystroke. Process 500 starts at step 502 where the interactive media guidance application determines whether the maximum number of assignable tuning sequence numbers has been reached. If not, the interactive media guidance application increments the sequence number (e.g., by incrementing a variable stored in memory 117 (FIG. 1)) and assigns it to the program (steps 504 and 506). In some embodiments the maximum tuning sequence number is set to the maximum number of cells that may be displayed simultaneously in transport bar 210. In other embodiments, it is set to a larger number.

In response to determining that the maximum tuning sequence number has been reached at step 502, the interactive media guidance application resets the tuning sequence number to 1 and assigns it to the program. In some embodiments, the interactive media guidance application may reset the tuning sequence number when the scan reaches its final program and restarts from the beginning. In such embodiments, the same tuning sequence number may be assigned to same program each time it is encountered in the scan sequence. However, if the number of programs in the scan sequence exceeds the maximum tuning sequence number, the interactive media guidance application may not attempt to match the tuning sequence numbers. If the programs in the scan sequence are different in subsequent passes through them (e.g., if a program has started or ended recently), tuning sequence numbers may not match.

Figure 6A:
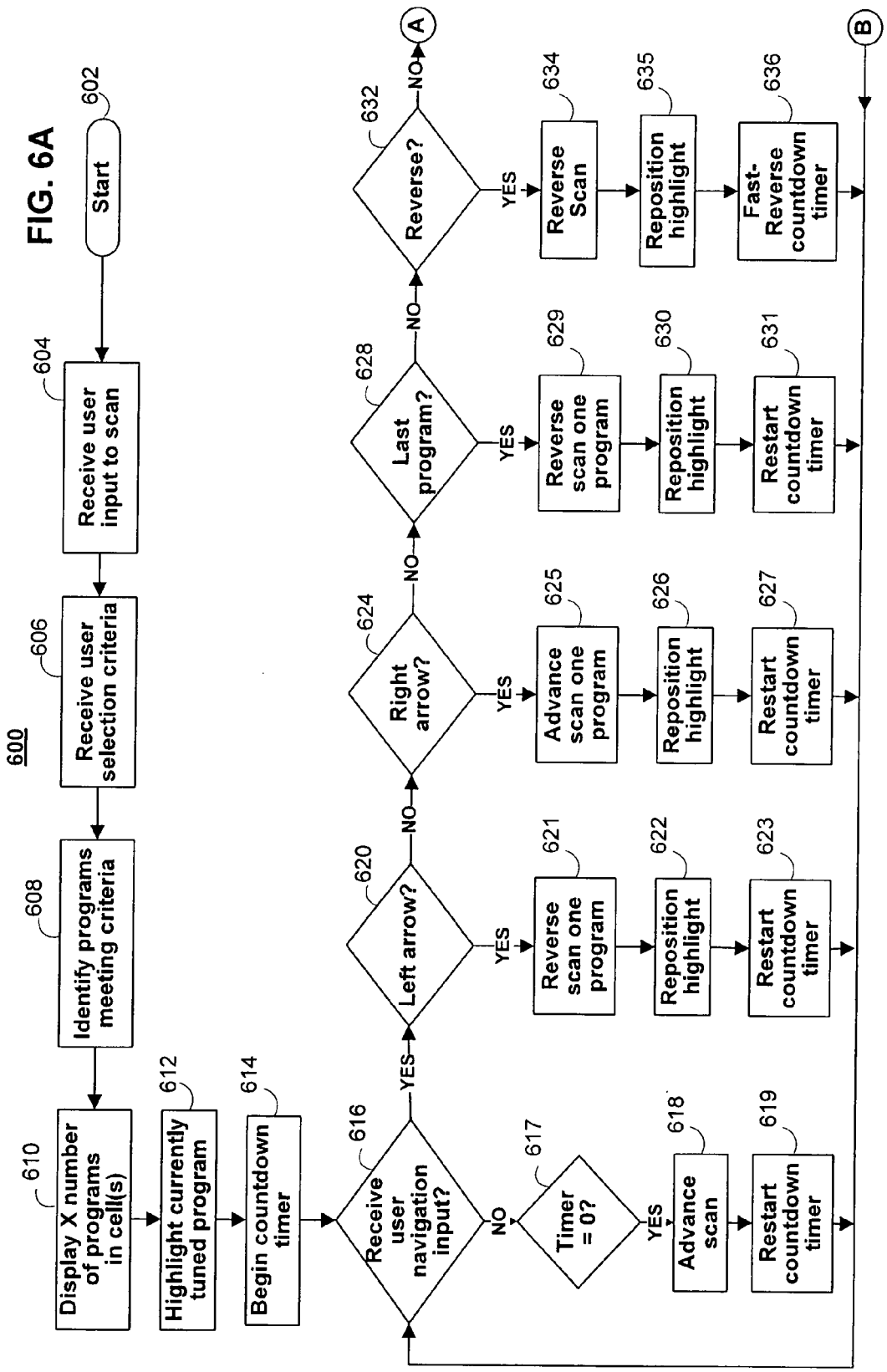
FIGS. 6A-C is a flow chart of an illustrative process for implementing and providing user navigation within a scan transport bar in accordance with one embodiment of the present invention.
Figure 6B:
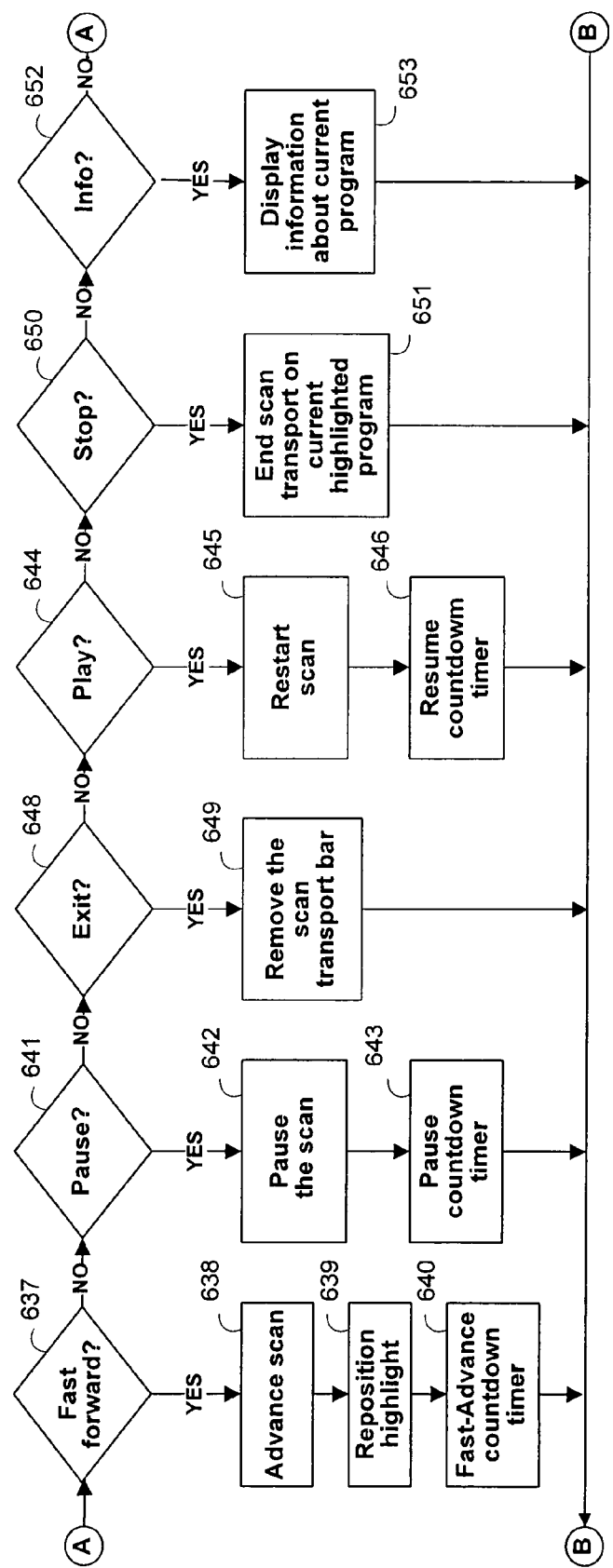
Figure 6C:
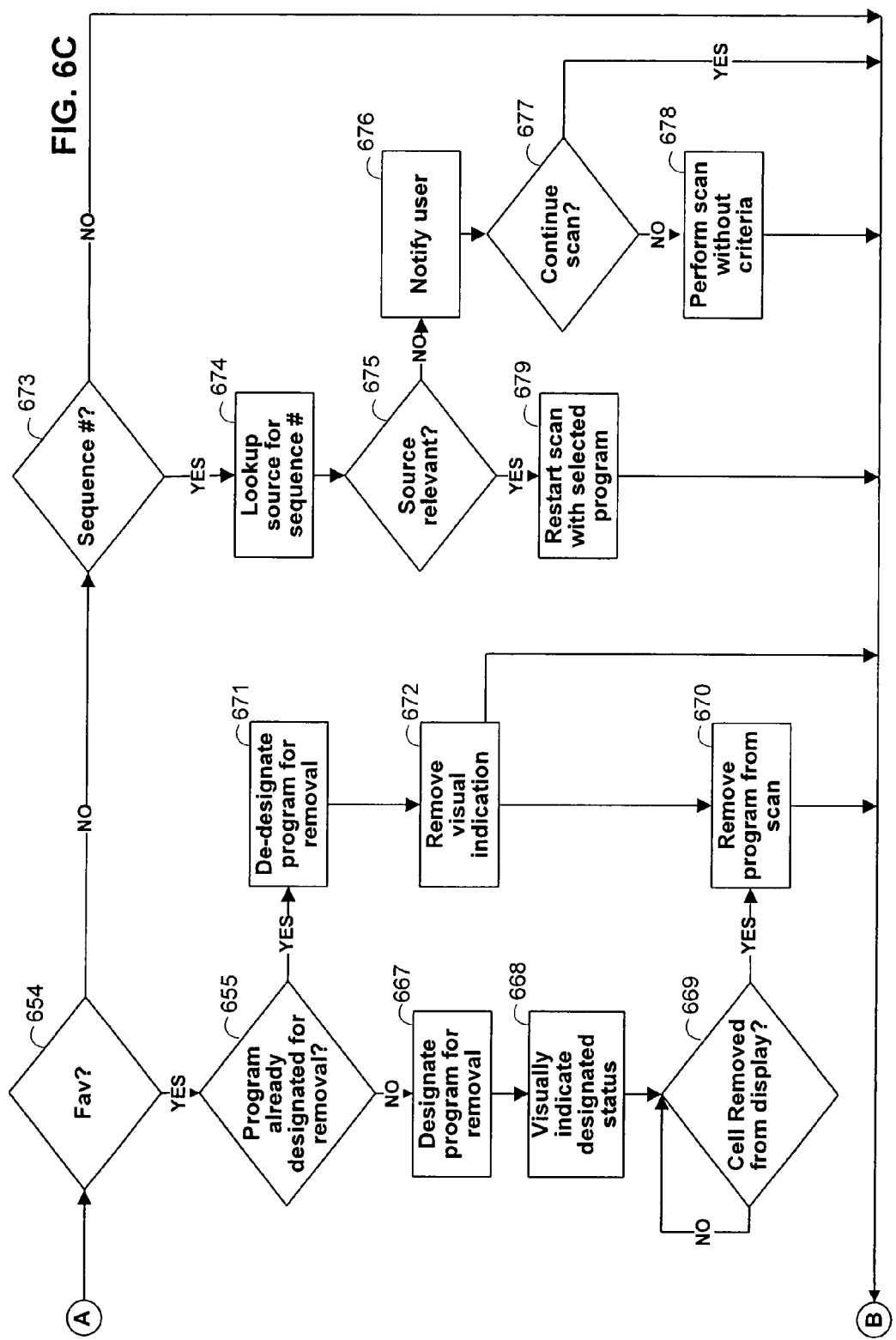

FIGS. 6a-6c are flowcharts of an illustrative process 600 for implementing transport bar 210 (FIG. 2) and providing user navigation within a scan in accordance with some embodiments of the present invention. The process starts at step 602. At step 604, the interactive media guidance application receives a user input to initiate a scan (e.g., the pressing of a scan button or some other suitable input made by the user with input device 114 (FIG. 1)). In the embodiment shown, the scan is performed according to user selection criteria received at step 606. The criteria may have been received from a user when, for example, the user set up a user profile, or in response to a user specifying scan criteria. Programs meeting the criteria are identified by the guidance application at step 608. This may be performed by, for example, comparing the criteria (stored in memory 117 (FIG. 1)) with guidance application data received from data source 124 (FIG. 1) and stored in memory 117 (FIG. 1). It should be noted that in some embodiments step 608 is performed more than once, such as upon each tune or at the beginning of each cycle of a scan (not shown).

At steps 610 and 612 the interactive media guidance application constructs the transport bar (such as described above in connection with FIGS. 2-5) with the desired number of cells, and highlights the currently-tuned program. At step 614 the interactive media guidance application starts the countdown timer (e.g., timer 292 of FIG. 2), and waits for a user navigation input (step 616) while monitoring for the next time to tune (step 617). When the timer hits its end point (e.g., at t=0), the interactive media guidance application advances the scan (step 618) by directing tuner 130 or 132 (FIG. 1) to tune to the next program and by highlighting (or adding) the next cell in the transport bar. At step 619, the countdown timer is restarted. Although not shown in FIGS. 6a-6c, steps 617-619 may also be performed while user navigation inputs are being processed.

Should the user enter a navigation input (e.g., by pressing a suitable key on input device 114 or by selecting an on-screen option), the process proceeds from step 616 to a navigation sequence that depends on the type of navigation command input by the user. In response to the user pressing a left or right arrow on input device 114 (FIG. 1) for example (steps 620 and 624), the interactive media guidance application will reverse or advance the scan one program as applicable (steps 621 and 625, respectively), reposition the highlight (steps 622 and 626), and restart the countdown timer (steps 623 and 627). In some embodiments, a press of the left or right arrow key will result in moving the highlight without causing a tune. This may allow the user to highlight a program on the transport bar that is not currently tuned. This may, for example, allow a user to retrieve information about any of the programs in the scan sequence without having to tune to tune to that program. It may also allow a user to shift the transport bar left or right to view the names and other details about programs in the scan sequence that are not currently being shown. A similar process (steps 628-631) is performed should the user enter a "last" command by pressing a last button on input 114 (FIG. 1). In any of these cases, repositioning the highlight may include redrawing all or part of the scan transport bar or shifting new content in from either end.

The interactive media guidance application may allow users to change the speed and/or direction of the scan via reverse and fast forward features. In response to a reverse input (e.g., the pressing of a reverse button on input device 114 (FIG. 1)) at step 632, the interactive media guidance application reverses the scan (step 634). This reverse may be contiguous, unlike the reversing of the scan performed at step 621 where in response to a left arrow the scan is reversed an entire program. In other words, the currently highlighted program may be rewound (e.g., played backwards from a buffer in faster-than-real-time) and the countdown timer may be fast-reversed (e.g., reversed faster than real-time) until the point at which the program was tuned is reached. Then the prior program in the scan sequence is tuned and reversed. After crossing a program boundary, the interactive media guidance application repositions the highlight to the previous program in the scan sequence (step 635) adjusting the displayed cells as appropriate to the chosen embodiment (e.g., shifting one or more cells into and/or out of the transport bar). To perform the reverse, memory 117 or recording device 118 (FIG. 1) is used as a real-time buffer for trick play transport control as known to those skilled in the art. In some embodiments, pressing the rewind key may result only in the reversing of the order of the scan. For example, upon receiving the rewind key press the interactive media guidance application may immediately select the most-recently tuned previous program (as with the left arrow key) and then continue in the reverse direction with each countdown timer timeout. A subsequent press of the rewind key may reverse the direction of the scan to the original forward direction, or it may adjust the speed of the scan (e.g., setting the countdown time to three seconds on each tune rather than five seconds). The interactive media guidance application may support a fixed set of starting values for the countdown timer, and the rewind key may be used to adjust this value in real time.

In response to a fast-forward input (e.g., the pressing of a fast-forward button on input device 114 (FIG. 1)) at step 637 (FIG. 6*b*), the interactive media guidance application advances the scan. This advance may be contiguous, like the reverse of step 634—the currently highlighted program may be fast-forwarded (step 638) and the countdown timer may be fast-advanced (e.g., advanced faster than real time) (step 640) until the point at which the countdown timer reaches its end point. Then the next program in the scan sequence may be tuned and fast forwarded. After crossing a program boundary, the interactive media guidance application repositions the highlight to the cell for the next program in the scan sequence (step 639), adjusting the displayed cells as appropriate to the chosen embodiment (e.g., shifting one or more cells into and/or out of the transport bar). In some embodiments, fast-forward scanning is provided only for portions of scans that have been reversed, or after a pause. In others, a second tuner may be leveraged to buffer the next program in the sequence. In response to a fast-forward command, the interactive media application would fast forward through as much of the next program in the sequence as is buffered or can be buffered during the fast-forward operation using a second tuner and memory 117 or recording device 118 (FIG. 1), until the countdown duration is reached. Then, if buffered, the interactive media guidance application would fast-forward the next program in the sequence, reposition the highlight, and fast-advance the countdown timer. In some embodiments, pressing the fast-forward key may result in the reversing of the order of the scan if it has earlier been reversed using the rewind key. For example, upon receiving the fast-forward key press the interactive media guidance application may immediately select the next program in the scan sequence (as with the right arrow key) and then continue in the forward direction with each countdown timer timeout. A subsequent press of the rewind key may adjust the speed of the scan (e.g., setting the countdown time to three seconds on each tune rather than five seconds). The interactive media guidance application may support a fixed set of starting values for the countdown timer, and the fast-forward key may be used to adjust this value in real time.

It should be noted that in both reversing and fast-forwarding the steps of repositioning the highlight (steps 635 and 639) may occur before or after adjusting the countdown timer (steps 636 and 640) depending when in the scan sequence the user issues the command. Repositioning the highlight may include the step of redrawing the scan transport bar or shifting in new programs from either end.

The interactive media guidance application may allow users to pause and restart the scan (steps 641 and 644). In response to a first pause input, the interactive media guidance application pauses the scan (step 642). During this time, the transport bar may remain on the screen, and the countdown timer is paused (step 643). When a play input is received (step 644), the interactive media guidance application restarts the scan (step 645), resuming the countdown timer from where it was paused (step 646). In some embodiments, the interactive program guide may buffer programs of the scan during this time (buffering each program for the amount of the countdown timer).

At step 648 the interactive media guidance application receives an exit user input. In response, the scan transport bar is removed (step 649). These steps may be performed when, for example, the scan is paused. In some embodiments, such as shown here, the scan may continue without the transport bar (in such embodiments, the scan is ended by a stop user input, steps 650-651). In others, the exit input ends the scan. The interactive media guidance application may re-display the transport bar in response to an "OK" or other suitable input (not shown in the figure).

At step 652, the interactive media guidance application receives an informational input (e.g., the pressing of an "info" key on input device 114 (FIG. 1)). In response, the interactive media guidance application retrieves from memory (e.g., memory 117 (FIG. 1)) and displays additional information for the program of the currently-highlighted cell. The information may be displayed in, for example, an additional overlay located above the transport bar.

In some embodiments, the interactive media guidance application may allow the user to remove (and reinstate) programs from the scan. In response to a suitable input (step 654 FIG. 6*c*), such as the pressing of a "FAV" (i.e., favorites) key on input device 114, the interactive media guidance application may remove (not shown), or designate for removal (described in steps 655, 667 and 671), from future tuning sequences the currently highlighted program in the scan. At step 655 the interactive media guidance application determines whether the currently-highlighted program is already designated for removal. If not, the program is designated for removal (step 667) and the designated status is visually indicated at step 668. In some embodiments, the status is visually indicated by a large "X" filling the cell. The cell will continue to stay on the transport bar until it is removed by the normal operation of the shifting of cells in and out of the transport bar (steps 669 and 670). While the cell remains on the display, the user may de-designate the program for removal by, for example, pressing the "FAV" key again (step 671), placing the program back into the scan sequence. The interactive media guidance application removes the visual indication of the designation accordingly at step 672). In some embodiments, when a program is removed from future tuning sequences, the interactive program guide may determine whether the program has changed since the last sequence. If the program has changed, the guidance application may either automatically include the new program in the sequence (if the new program meets any active user scan criteria) or prompt the user to indicate whether it should be included.

The interactive media guidance application may also allow users to navigate within the scan by entering tuning sequence numbers. In response to receiving a tuning sequence number (step 673), the interactive media guidance application determines the source associated with the sequence number from, for example, a table mapping sources to sequence numbers (step 674). At step 675, the interactive media guidance application determines whether the source is relevant to the scan (this step may be omitted for scans that are not based on user-specified or other criteria). If the source is not currently relevant (i.e., the program on the source has changed during the scan to a program not meeting applicable scan criteria) then the interactive media guidance application notifies the user (step 676), prompting the user to specify whether the scan should continue without the source, or whether the applicable criteria should be suspended and the scan proceed including the new program (steps 677 and 678). In some embodiments, the criteria may be retained as an exception even if the selected program does not match the criteria. In response to determining that the source is relevant at step 675, the interactive media guidance application restarts the scan with the selected program (step 679).

All of the flow charts and processes described above are illustrative. Steps may be added or removed to any of the flow charts, and steps may be performed in any suitable order. The above described embodiments of the present invention are presented for purposes of illustration and not of limitation, and the present invention is limited only by the claims which follow.

What is claimed is:

1. A method for generating a program scan toolbar for allowing users of an interactive media guidance application to navigate programs within a program scan, comprising:
identifying a plurality of programs for inclusion in a program scan;
retrieving information identifying each of the plurality of programs from memory;
generating a cell for each of the plurality of programs, each cell containing the identifying information for a program;
assigning a tuning sequence number for each of the plurality of programs;
displaying the plurality of cells;
performing a program scan in which each of the plurality of programs is successively tuned to for a defined period of time;
receiving a user navigation numerical input comprising a tuning sequence number; and
in response to receiving the tuning sequence number, directing the tuner to the received tuning sequence number and, without further user input, restarting the program scan from the program assigned the tuning sequence number.

2. The method defined in claim 1 further comprising highlighting the cell of the currently tuned-to program with a highlight region.

3. The method defined in claim 2 further comprising:
receiving a user input to advance the scan one program; and
in response to the user input advancing the scan one program, highlighting the cell of, and tuning to, the next program in the scan tuning sequence.

4. The method defined in claim 2 further comprising:
receiving a user input to reverse the scan one program; and
in response to the user input reversing the scan one program, highlighting the cell of, and tuning to, the prior program in the scan tuning sequence.

5. The method defined in claim 1 wherein the number of programs and tuning sequence numbers is greater than the number of cells displayed simultaneously.

6. The method defined in claim 1 wherein the plurality of cells are simultaneously displayed with at least a substantial portion of the current program of the scan.

7. The method defined in claim 1 wherein only a subset of the plurality of cells is simultaneously displayed.

8. The method defined in claim 1 further comprising:
receiving an input to remove a program from the scan; and
in response to receiving the input to remove the program from the scan:
designating the program for removal from the scan; and
visually indicating in the cell of the program that the program has been designated for removal from the scan.

9. The method defined in claim 8 further comprising:
receiving an input to de-designate a program for removal from the scan; and
in response to receiving the input to de-designate the program for removal from the scan:
de-designating the program for removal from the scan and
removing the visual indication from the cell.

10. The method defined in claim 1 comprising:
receiving a user input to reverse the scan; and
in response to receiving the user input to reverse the scan, reversing the scan.

11. The method defined in claim 10 wherein reversing the scan comprises playing the currently-tuned program backwards from a buffer.

12. The method defined in claim 11 wherein playing the currently-tuned program backwards comprises playing the currently-tuned program backwards from the buffer faster than real time.

13. The method defined in claim 10 further comprising:
receiving a second user input to reverse the scan; and
in response to the second user input, adjusting the speed of the reverse of the scan.

14. The method defined in claim 10 wherein reversing the scan comprises reversing the order in which the programs are selected in the scan.

15. The method defined in claim 1 comprising:
receiving a user input to fast-forward the scan; and
in response to receiving the user input to fast-forward the scan, fast-forwarding the scan.

16. The method defined in claim 15 wherein fast-forwarding the scan comprises playing the currently-tuned program from a buffer faster than real time.

17. The method defined in claim 15 further comprising:
receiving a second user input to fast-forward the scan; and
in response to the second user input, adjusting the speed of the fast-forward of the scan.

18. The method defined in claim 15 wherein fast-forwarding the scan comprises reversing the direction of the scan if it had been previously reversed.

19. The method defined in claim 1 further comprising displaying a countdown timer indicating the time until the next tune in the scan occurs.

20. The method defined in claim 19 further comprising:
receiving a user input to reverse the scan; and
in response to receiving the user input to reverse the scan, reversing the countdown timer.

21. The method defined in claim 20 wherein reversing the countdown timer comprises reversing the countdown timer faster than real time.

22. The method defined in claim 19 further comprising:
receiving a user input to fast-forward the scan; and
in response to receiving the user input to fast-forward the scan, advancing the countdown timer in faster than real time.

23. A system for generating a program scan toolbar for allowing users of an interactive media guidance application to navigate programs within a program scan, comprising:
a user input device; and
control circuitry comprising memory and a tuner, the control circuitry configured to:
identify a plurality of programs for inclusion in a program scan;
retrieve information identifying each of the plurality of programs from the memory;
generate a cell for each of the plurality of programs, each cell containing the identifying information for a program;
assign a tuning sequence number for each of the plurality of programs;
direct a display device to display the plurality of cells;
initiate a program scan in which the control circuitry directs the tuner to successively tune to each of the plurality of programs for a defined period of time;
receive a user navigation numerical input from the user input device comprising a tuning sequence number; and in response to receiving the tuning sequence number, directing the tuner to the received tuning sequence number and, without further user input, restarting the program scan from the program assigned the tuning sequence number.

24. The system defined in claim 23 wherein the control circuitry is further configured to highlight the cell of the currently tuned-to program with a highlight region.

25. The system defined in claim 24 wherein the control circuitry is further configured to:
receive a user input from the user input device to advance the scan one program; and
in response to the user input advancing the scan one program, highlight the cell of, and directing the tuner to tune to, the next program in the scan tuning sequence.

26. The system defined in claim 24 wherein the control circuitry is further configured to:
receive a user input from the user input device to reverse the scan one program; and
in response to the user input reversing the scan one program, highlighting the cell of, and directing the tuner to tune to, the prior program in the scan tuning sequence.

27. The system defined in claim 23 wherein the control circuitry is further configured so that the number of programs and tuning sequence numbers is greater than the number of cells displayed simultaneously.

28. The system defined in claim 23 wherein the control circuitry is further configured so that the plurality of cells are simultaneously displayed with at least a substantial portion of the current program of the scan.

29. The system defined in claim 23 wherein the control circuitry is further configured so that only a subset of the plurality of cells is simultaneously displayed.

30. The system defined in claim 23 wherein the control circuitry is further configured to:
receive an input from the user input device to remove a program from the scan; and
in response to receiving the input to remove the program from the scan:
designate the program for removal from the scan; and
visually indicate in the cell of the program that the program has been designated for removal from the scan.

31. The system defined in claim 30 wherein the control circuitry is further configured to:
receive an input from the user input device to de-designate a program for removal from the scan; and
in response to receiving the input to de-designate the program for removal from the scan:
de-designate the program for removal from the scan and remove the visual indication from the cell.

32. The system defined in claim 23 wherein the control circuitry is further configured to:
receive a user input from the user input device to reverse the scan; and
in response to receiving the user input to reverse the scan, reversing the scan.

33. The system defined in claim 32 wherein the control circuitry is further configured to reverse the scan by playing the currently-tuned program backwards from a buffer.

34. The system defined in claim 33 wherein the control circuitry is further configured to play the currently tuned program backwards from the buffer faster than real time.

35. The system defined in claim 32 wherein the control circuitry is further configured to:
receive a second user input to reverse the scan; and
in response to the second user input, adjust the speed of the reverse of the scan.

36. The system defined in claim 32 wherein the control circuitry is further configured to reverse the scan by reversing the order in which the programs are selected in the scan.

37. The system defined in claim 23 wherein the control circuitry is further configured to:
receive a user input from the user input device to fast-forward the scan; and
in response to receiving the user input to fast-forward the scan, fast-forwarding the scan.

38. The system defined in claim 37 wherein the control circuitry is further configured to fast-forward the scan by playing the currently-tuned program from a buffer faster than real time.

39. The system defined in claim 37 wherein the control circuitry is further configured to:
receive a second user input to fast-forward the scan; and
in response to the second user input, adjust the speed of the fast-forward of the scan.

40. The system defined in claim 37 wherein the control circuitry is further configured to fast-forward the scan by reversing the direction of the scan if it had been previously reversed.

41. The system defined in claim 23 wherein the control circuitry is further configured to display a countdown timer indicating the time until the next tune in the scan occurs.

42. The system defined in claim 41 wherein the control circuitry is further configured to:
receive a user input to reverse the scan; and
in response to the user input, reverse the countdown timer.

43. The system defined in claim 42 wherein the control circuitry is further configured to reverse the countdown timer in faster than real time.

44. The system defined in claim 41 wherein the control circuitry is further configured to:
receive a user input to fast-forward the scan; and
in response to the user input, fast-forward the countdown timer in faster than real time.

45. A system for generating a program scan toolbar for allowing users of an interactive media guidance application to navigate programs within a program scan, comprising:
means for identifying a plurality of programs for inclusion in a program scan;
means for retrieving information identifying each of the plurality of programs from memory;
means for generating a cell for each of the plurality of programs, each cell containing the identifying information for a program;
means for assigning a tuning sequence number for each of the plurality of programs;
means for displaying the plurality of cells;
means for performing a program scan in which each of the plurality of programs is successively tuned to for a defined period of time;
means for receiving a user navigation numerical input comprising a tuning sequence number; and
means for, in response to receiving the tuning sequence number, directing the tuner to the received tuning sequence number and, without further user input, restarting the program scan from the program assigned the tuning sequence number.

46. The system defined in claim 45 further comprising means for highlighting the cell of the currently tuned-to program with a highlight region.

47. The system defined in claim 45 further comprising:
means for receiving a user input to advance the scan one program; and means for, in response to the user input advancing the scan one program, highlighting the cell of, and tuning to, the next program in the scan tuning sequence.

48. The system defined in claim 45 further comprising:
means for receiving a user input to reverse the scan one program; and
means for, in response to the user input reversing the scan one program, highlighting the cell of, and tuning to, the prior program in the scan tuning sequence.

49. The system defined in claim 45 wherein the number of programs and tuning sequence numbers is greater than the number of cells displayed simultaneously.

50. The system defined in claim 45 wherein the plurality of cells are simultaneously displayed with at least a substantial portion of the current program of the scan.

51. The system defined in claim 45 wherein only a subset of the plurality of cells is simultaneously displayed.

52. The system defined in claim 45 further comprising:
means for receiving an input to remove a program from the scan; and
means for, in response to receiving the input to remove the program from the scan:
designating the program for removal from the scan; and
visually indicating in the cell of the program that the program has been designated for removal from the scan.

53. The system defined in claim 52 further comprising:
means for receiving an input to de-designate a program for removal from the scan; and
means for, in response to receiving the input to de-designate the program for removal from the scan:
de-designating the program for removal from the scan and
removing the visual indication from the cell.

54. The system defined in claim 45 comprising:
means for receiving a user input to reverse the scan; and
means for, in response to receiving the user input to reverse the scan, reversing the scan.

55. The system defined in claim 54 wherein the means for reversing the scan comprises means for playing the currently-tuned program backwards from a buffer.

56. The system defined in claim 55 wherein the means for playing the currently-tuned program backwards comprises means for playing the currently-tuned program backwards from the buffer faster than real time.

57. The system defined in claim 54 further comprising:
means for receiving a second user input to reverse the scan; and
means for, in response to the second user input, adjusting the speed of the reverse of the scan.

58. The system defined in claim 54 wherein the means for reversing the scan comprises means for reversing the order in which the programs are selected in the scan.

59. The system defined in claim 45 further comprising:
means for receiving a user input to fast-forward the scan; and
means for, in response to receiving the user input to fast-forward the scan, fast-forwarding the scan.

60. The system defined in claim 59 wherein the means for fast-forwarding the scan comprises means for playing the currently-tuned program from a buffer faster than real time.

61. The system defined in claim 59 further comprising:
means for receiving a second user input to fast-forward the scan; and
means for, in response to the second user input, adjusting the speed of the fast-forward of the scan.

62. The system defined in claim 59 wherein the means for fast-forwarding the scan comprises means for reversing the direction of the scan if it had been previously reversed.

63. The system defined in claim 45 further comprising means for displaying a countdown timer indicating the time until the next tune in the scan occurs.

64. The system defined in claim 63 further comprising:
means for receiving a user input to reverse the scan; and
means for, in response to receiving the user input to reverse the scan, reversing the countdown timer.

65. The system defined in claim 64 wherein the means for reversing the countdown timer comprises means for reversing the countdown timer faster than real time.

66. The system defined in claim 63 further comprising:
means for receiving a user input to fast-forward the scan; and
means for, in response to receiving the user input to fast-forward the scan, advancing the countdown timer in faster than real time.

67. A method for allowing users of an interactive media guidance application to navigate within a program scan out of the order of the tuning sequence of the scan, comprising:
directing at least one tuner to perform a program scan in which each of a plurality of programs is successively tuned to for a defined period of time;
receiving a user input to tune to a program in the scan that is not the next or prior program in the tuning sequence; and
in response to the user input, tuning to the program in the scan and, without further user input, automatically resuming the scan tuning sequence from that program.

68. The method defined in claim 67 wherein the user input is a tuning sequence number.

69. The method defined in claim 67 wherein the user input positions a highlight region on a program that is not the next or prior program in the tuning sequence.

70. A method for allowing users of an interactive media guidance application to access program information for programs within a program scan out of the order of the tuning sequence of the scan, comprising:
directing at least one tuner to perform a program scan in which each of a plurality of programs is successively tuned to for a defined period of time;
while the at least one tuner continues to perform the program scan, retrieving information specific to at least two programs from program guide data stored in a memory, wherein the retrieved information comprises at least two program titles, and wherein the at least two programs are programs within the scan tuning sequence other than the currently tuned to program; and
displaying, during the scan, the retrieved information, wherein the displaying comprises simultaneously displaying the at least two program titles, and wherein the currently tuned to program is independent of user interactions with the displayed at least two program titles.

71. The method defined in claim 70 wherein displaying the retrieved information comprises displaying the retrieved information in a cell of a scan transport bar.

72. The method defined in claim 70 wherein:
the method further comprises displaying a plurality of cells in a scan transport bar, wherein each cell includes information about programs within the scan; and
displaying the retrieved information comprises displaying the retrieved information in response to a user selection of a cell of the plurality of cells.

73. The method of claim 70, wherein the retrieving information comprises retrieving the information without receiving user input.

74. A system for allowing users of an interactive media guidance application to navigate within a program scan out of the order of the tuning sequence of the scan, comprising:
- a user input device; and
- control circuitry comprising a tuner and configured to:
  - perform a program scan in which the control circuitry directs the tuner to successively tune to each of a plurality of programs for a defined period of time;
  - receive a user input from the user input device to tune to a program in the scan that is not the next or prior program in the tuning sequence; and
  - in response to the user input, direct the tuner to tune to the program in the scan and, without further user input, automatically resume the scan tuning sequence from that program.

75. The system defined in claim 74 wherein the user input is a tuning sequence number.

76. The system defined in claim 74 wherein the user input positions a highlight region on a program that is not the next or prior program in the tuning sequence.

77. A system for allowing users of an interactive media guidance application to access program information for programs within a program scan out of the order of the tuning sequence of the scan, comprising:
- a user input device; and
- control circuitry comprising a tuner and configured to:
  - perform a program scan in which the control circuitry directs the tuner to successively tune to each of a plurality of programs for a defined period of time;
  - while the program scan continues to be performed, retrieve information specific to at least two programs from program guide data stored in a memory, wherein the retrieved information comprises at least two program titles, and wherein the at least two programs are programs within the scan tuning sequence other than the currently tuned to program; and
  - direct a display device to display, during the scan, the retrieved information, wherein the display of the retrieved information includes the simultaneous display of the at least two program titles, and wherein the currently tuned to program is independent of user interactions with the displayed at least two program titles.

78. The system defined in claim 77 wherein the control circuitry is further configured to direct the display device to display the retrieved information in a cell of a scan transport bar.

79. The system defined in claim 77 wherein the control circuitry is further configured to:
- direct the display device to display a plurality of cells in a scan transport bar, wherein each cell includes information about programs within the scan; and
- direct the display device to display the retrieved information in response to receiving from a user input device a user selection of a cell of the plurality of cells.

80. The system of claim 77, wherein the information is retrieved without receiving user input.

81. A system for allowing users of an interactive media guidance application to navigate within a program scan out of the order of the tuning sequence of the scan, comprising:
- means for performing a program scan in which each of a plurality of programs is successively tuned to for a defined period of time;
- means for receiving a user input to tune to a program in the scan that is not the next or prior program in the tuning sequence; and
- means for in response to the user input, tuning to the program in the scan and, without further user input, automatically resuming the scan tuning sequence from that program.

82. The system defined in claim 81 wherein the user input is a tuning sequence number.

83. The system defined in claim 81 wherein the user input positions a highlight region on a program that is not the next or prior program in the tuning sequence.

84. A system for allowing users of an interactive media guidance application to access program information for programs within a program scan out of the order of the tuning sequence of the scan, comprising:
- means for performing a program scan in which each of a plurality of programs is successively tuned to for a defined period of time;
- means for retrieving, while the at least one tuner continues to perform the program scan, information specific to at least two programs from program guide data stored in a memory, wherein the retrieved information comprises at least two program titles, and wherein the at least two programs are programs within the scan tuning sequence other than the currently tuned to program; and
- means for displaying, during the scan, the retrieved information, wherein the means for displaying comprises means for simultaneously displaying the at least two program titles, and wherein the currently tuned to program is independent of user interactions with the displayed at least two program titles.

85. The system defined in claim 84 wherein the means for displaying the retrieved information comprises means for displaying the retrieved information in a cell of a scan transport bar.

86. The system defined in claim 84 wherein the system further comprises:
- means for displaying a plurality of cells in a scan transport bar, wherein each cell includes information about programs within the scan; and
- the means for displaying the retrieved information comprises means for displaying the retrieved information in response to a user selection of a cell of the plurality of cells.

87. The system of claim 84, wherein the means for retrieving information comprises means for retrieving the information without receiving user input.

* * * * *

UNITED STATES PATENT AND TRADEMARK OFFICE
CERTIFICATE OF CORRECTION

| | | |
|---|---|---|
| PATENT NO. | : 8,407,737 B1 | Page 1 of 1 |
| APPLICATION NO. | : 11/827246 | |
| DATED | : March 26, 2013 | |
| INVENTOR(S) | : Ellis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,198 days.

Signed and Sealed this
Eleventh Day of November, 2014

Michelle K. Lee
*Deputy Director of the United States Patent and Trademark Office*